United States Patent
Watkins et al.

(10) Patent No.: US 6,932,047 B2
(45) Date of Patent: Aug. 23, 2005

(54) PLANETARY PISTON ROTARY ENGINE

(75) Inventors: Ernest R. Watkins, deceased, late of Harriman, TN (US); by Bobbie Watkins, legal representative, Harriman, TN (US); Lawrence A. Hendrix, Knoxville, TN (US); Barton W. Watkins, Knoxville, TN (US)

(73) Assignee: Power Source Technologies, Knoxville, TN (US)

( * ) Notice: Subject to any disclaimer, the term of this patent is extended or adjusted under 35 U.S.C. 154(b) by 0 days.

(21) Appl. No.: 10/934,001

(22) Filed: Sep. 3, 2004

(65) Prior Publication Data

US 2005/0051129 A1 Mar. 10, 2005

Related U.S. Application Data

(60) Provisional application No. 60/510,204, filed on Oct. 10, 2003, and provisional application No. 60/500,117, filed on Sep. 4, 2003.

(51) Int. Cl.[7] .............................. F02B 53/00; F01C 1/00
(52) U.S. Cl. ....................... 123/241; 123/246; 418/225; 418/227
(58) Field of Search ......................... 123/241; 418/246, 418/225, 227, 165

(56) References Cited

U.S. PATENT DOCUMENTS

| | | | | |
|---|---|---|---|---|
| 949,605 A | | 2/1910 | Taylor | 418/165 |
| 2,136,066 A | * | 11/1938 | Walters et al. | 418/227 |
| 2,454,006 A | | 11/1948 | Plummer | 123/222 |
| 3,865,086 A | | 2/1975 | Lee | 123/241 |
| 3,865,522 A | | 2/1975 | Nardi | 418/225 |
| 4,057,035 A | * | 11/1977 | Su | 418/227 |
| 4,274,374 A | | 6/1981 | Lee | 123/241 |
| 4,481,920 A | | 11/1984 | Carr et al. | 123/246 |
| 4,898,525 A | * | 2/1990 | Hippocrates | 418/227 |
| 4,926,816 A | | 5/1990 | Kita et al. | 123/203 |
| 5,039,290 A | | 8/1991 | Nardi | 418/225 |
| 6,503,072 B2 | | 1/2003 | Nardi | 418/225 |
| 6,814,045 B2 | * | 11/2004 | Masters | 123/241 |

FOREIGN PATENT DOCUMENTS

DE        42 42 966        12/1992 ................. 123/241

* cited by examiner

Primary Examiner—Thai-Ba Trieu
(74) Attorney, Agent, or Firm—Pitts & Brittian, P.C.

(57) ABSTRACT

An apparatus for a rotary internal combustion engine. The engine has three rotating members that orbit about the center of a three-armed rotor as the rotor rotates within a housing with three lobes. The tips of the rotating members engage the lobes and a circular cutout in the rotor (1002) as the rotor rotates. A back plate includes inlet and exhaust ports that are sequentially opened and closed by the rotating members and rotor as they move within the housing. A front plate rotates with the rotor and separates the combustion chambers from a planetary gear assembly that ensures the alignment of the rotating members as they orbit the rotor shaft. Fuel is injected after the compression cycle is initiated.

29 Claims, 16 Drawing Sheets

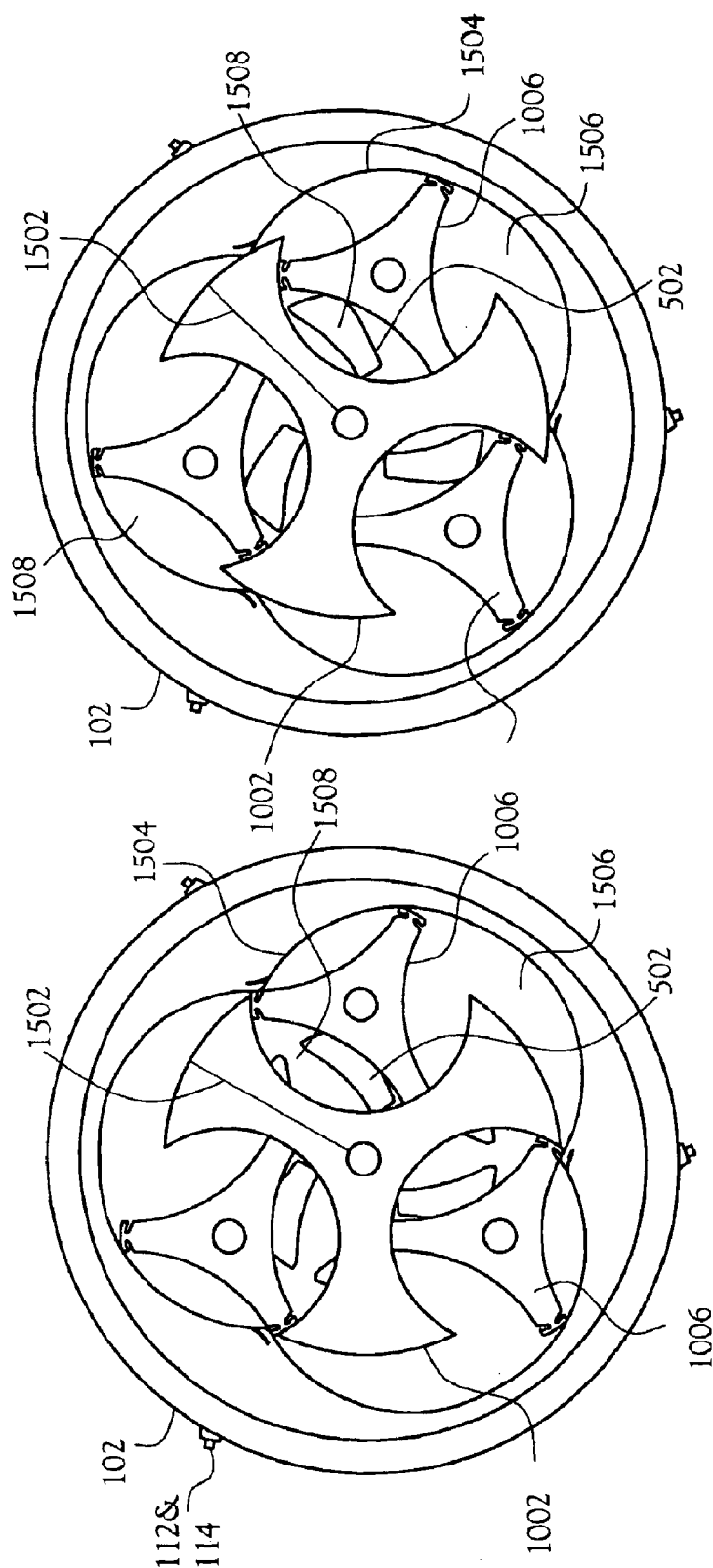

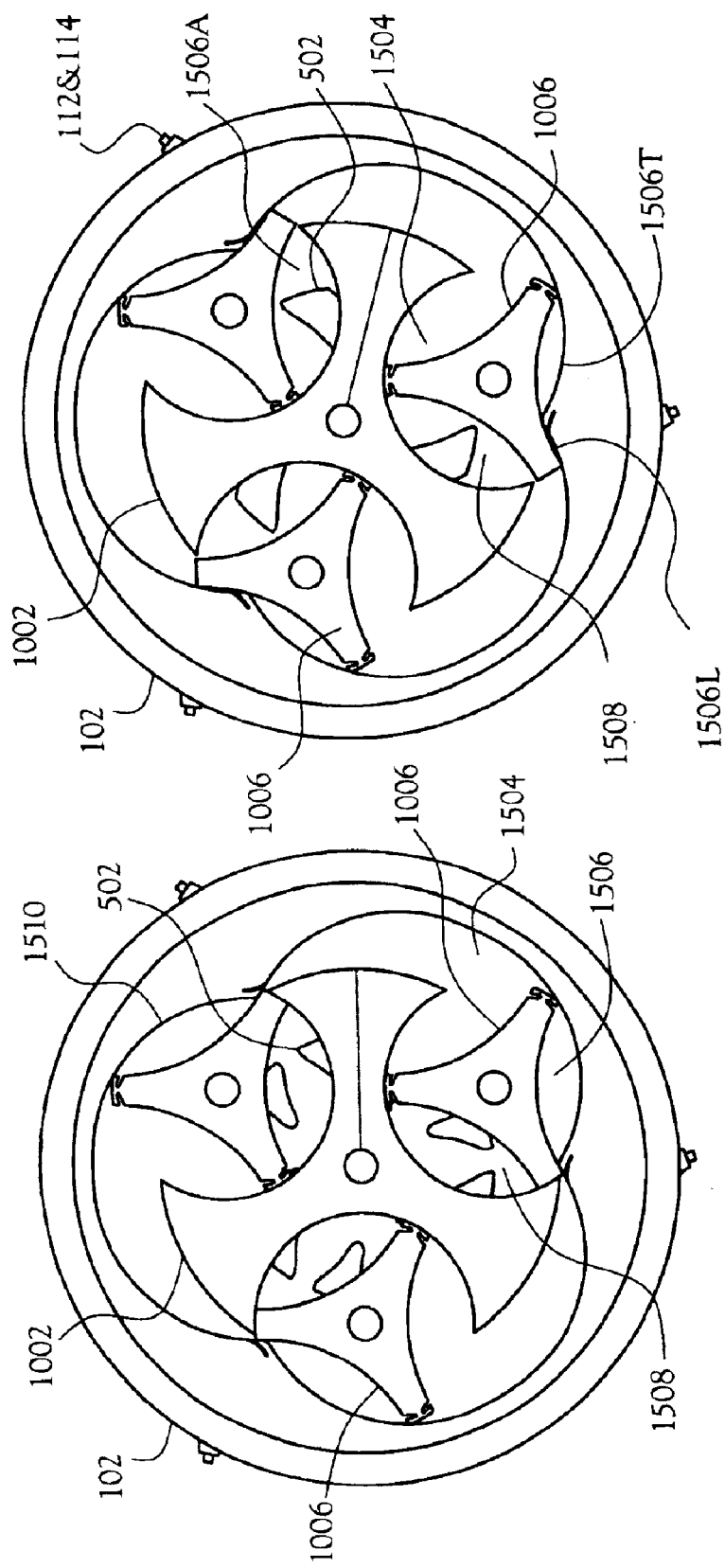

PLANETARY PISTON ROTARY ENGINE

CROSS-REFERENCE TO RELATED APPLICATIONS

This Application claims the benefit of U.S. Provisional Application No. 60/500,117, filed Sep. 4, 2003, and U.S. Provisional Application No. 60/510,204, filed Oct. 10, 2003.

STATEMENT REGARDING FEDERALLY SPONSORED RESEARCH OR DEVELOPMENT

Not Applicable

BACKGROUND OF THE INVENTION

1. Field of Invention

This invention pertains to a rotary engine with planetary rotating members. More particularly, this invention pertains to an internal combustion engine with multivaned rotating members orbiting about a rotor in a chamber housing.

2. Description of the Related Art

Rotary motors in the prior art fall into two categories: those that are driven by steam and those that are internal combustion engines. Steam driven rotary motors typically include an expansion chamber that applies force to a member, causing a rotor to rotate. Examples of such steam driven rotary motors include U.S. Pat. No. 949,605, titled "Rotary Motor," issued on Feb. 15, 1910, to W. Taylor; U.S. Pat. No. 3,865,086, titled "Rotary Steam Engine," issued on Feb. 11, 1975, to C. Lee; U.S. Pat. No. 5,039,290, titled "Rotary Expander," issued on Aug. 13, 1991, to A. Nardi; and U.S. Pat. No. 6,503,072, titled "Pressure articulated positive displacement, single expansion rotary engine," issued on Jan. 7, 2003, to Nardi.

Through the years, attempts at developing a rotary internal combustion engine have been made. The most successful of these attempts is exemplified by the Wankel engine disclosed in U.S. Pat. No. 4,926,816, titled "Rotary Piston Engine," issued on May 22, 1990, to Kita, et al. The conventional Wankel engine includes a rotor housing having an inner wall of trochoidal configuration, a triangular rotor disposed in a rotor cavity of the rotor housing for rotation with its apex portions in sliding contact with the inner wall of the rotor housing, and an eccentric shaft supporting the rotor.

An early example of a different type of internal combustion rotary engine is disclosed in U.S. Pat. No. 2,454,006, titled "Internal-Combustion Rotary Engine," issued on Nov. 16, 1948, to C. E. Plummer. This patent discloses an engine with a cylindrical casing 10 with two abutments 17, 18 protruding into the annular chamber 14 formed by the casing 10 and the rotor 13. The annular chamber 14 is divided into a power, firing and exhaust zone 15 and a compression and intake zone 16 that are diametrically opposite each other. The rotor 13 has two spider type bladed rotatable vanes 23 that rotate when engaging the abutments 17, 18. Attached to the casing 10 is a housing 28 carrying a rotatable combined firing and compression cylinder 29. Diametrically opposite the housing 28 on the casing 10 are the intake and exhaust leads 21, 22, respectively.

U.S. Pat. No. 3,865,522, titled "Rotary Internal Combustion Engine," issued on Feb. 11, 1975, to A. Nardi. This patent discloses an engine with a cylindrical casing 10 having a disc-shaped central inner cavity 12 with eight radial recesses or notches 14 formed in the casing 10. A main disc or rotor 16 is sized to fit into the inner cavity 12. The rotor 16 has partial circular cavities 20, 22 formed diametrically opposite each other. The partial circular cavities 20, 22 receive lever wheels 26, 28 that rotate within the partial circular cavities 20, 22. The lever wheels 26, 28 each have three equally spaced radial arms 30 that engage the notches 14 as the rotor 16 rotates within the casing 10. The fuel intake system includes ducts 34 formed through the casing 10 adjacent the notches 14. Exhaust ports 38 are formed through the body of the rotor 16 and communicate with an exhaust manifold 40 vented to the outside of the casing 10. U.S. Pat. No. 4,274,374, titled "Air-Cooled Rotary Internal Combustion Engine," issued on Jun. 23, 1981, to C. Lee, is an improvement on the Lee patent described above. The improvement involved adding air-cooling to the engine.

U.S. Pat. No. 4,481,920, titled "Rotary Internal Combustion Engine, Fluid Motor and Fluid Pump Having Planetating Gear Pistons," issued on Nov. 13, 1984, to Carr, et al., discloses an intake rotor 420 surrounded by three secondary rotors 440, all nested within reactor lobe assembly 640. The valve plates 330, 230, 240 and the front case cover 150 each mount forward of reactor lobe assembly 640 with shaft 430 of exhaust/intake rotor 420 being journalled within the central hole of rotating valve plate 330, stationary exhaust valve plate 240 and front case cover 150. Reactor lobe assembly 640 has nine internal reactor lobes 460 with spark plug access holes 195 extending through the lobes 460. Also mounted within the reactor lobe assembly 640 is a pressure seal 550 and spring 650 assembly which is placed between each reactor lobe 460.

German Patent Application DE 42 42 966, dated Dec. 18, 1992, discloses a rotary engine. A housing 13 encloses a cylindrically shaped rotor 2, which has four niches 4 in the circumferential surface 3. The niches 4 receive pistons 5 that have a star-like shape with three lips 7 spaced about the center of rotation 6 of the pistons 5. The inner surface 8 of the housing 13 has a wave-shape with troughs 18 and peaks 20. Each of the four peaks 20 have a spark plug 14 flanked on the leading side by a exhaust valve 16 and on the trailing side by an intake valve 15.

The pistons 5 rotate clockwise as they orbit the center 1 of the rotor 2, which rotates counterclockwise and carries the pistons 5. One or more of the lips 7 of each piston 5 continuously keeps in contact with the inner surface 8 of the housing 13 as the rotor 2 rotates within the housing 13. The German Patent Application does not disclose or teach the mechanism by which the pistons 5 rotate as they orbit the center 1 of the rotor 2.

FIGS. 1 and 3–9 of the German application illustrate the pistons 5 moving toward the exhaust valves 16, which indicates that the engine uses a decreasing volume to push the exhaust out of the exhaust valve 16. Likewise, FIGS. 2 and 3–9 illustrate the pistons 5 moving away from the intake valves 15, which indicates that intake air is sucked into the engine by increasing the volume of the chamber, thereby drawing the intake air into the engine.

The operation of the German engine is illustrated in FIGS. 4–9 with FIGS. 4 & 5 showing the engine beginning to rotate. FIGS. 4–9 use Roman numerals to indicate the rotor 2 position as it rotates in the housing 13. The pistons 5 operate in tandem, that is, opposing pistons 5, 5" at positions I, III draw intake air-fuel through valves 15', 15'" and exhaust combustion gas through valves 16, 16". See FIG. 6. At the same time, the other two pistons 5', 5'" at positions II, IV undergo combustion 25', 25'" on one side and compression 24', 24'" on the other side. See FIG. 6. FIG. 7 shows the positions have rotated 90° with the positions rotated counterclockwise, but the pistons 5 at those positions performing the same operations. That is, the piston 5, 5" at positions I, III are always performing intake and exhaust. See FIGS. 6–9. Likewise, the piston 5', 5'" at positions II, IV are always undergoing compression and combustion.

BRIEF SUMMARY OF THE INVENTION

According to one embodiment of the present invention, a rotary internal combustion engine with a plurality of rotating members is provided. The rotating members orbit about the center of a rotor as the rotor rotates within a housing with a plurality of lobes. The tips, or apex, of the rotating members engage the lobes and a circular cutout in the rotor as the rotor rotates. As the rotating members move around the housing, the four internal combustion cycles (intake, compression, power, and exhaust) occur. As each rotating member moves around the housing, the power and exhaust cycles occur on the side of the rotating member vane that is trailing and the intake and compression cycles occur on the side of the rotating member that is leading. In particular, as one side of the rotating member is compressing the intake gas, another side of the rotating member is undergoing the power cycle.

In one embodiment, a back plate attached to one end of the housing includes inlet and exhaust ports that are sequentially opened and closed by the rotating members and rotor as they move within the housing. A front plate rotates with the rotor and separates the combustion chambers from a planetary gear assembly that ensures the alignment of the rotating members as they orbit the rotor shaft.

The intake gas aids in scavenging the combustion gas out the exhaust ports. In one embodiment, the intake gas does not contain fuel, which is injected after the compression cycle is initiated. In another embodiment, the intake air passes through a carburetor and an air-fuel mixture passes through the inlet ports. In one embodiment, a spark plug initiates combustion. In another embodiment, compression ignition initiates combustion.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 15A–F are plan views of the rotor and rotating members rotating through one firing cycle.

DETAILED DESCRIPTION OF THE INVENTION

An apparatus for a rotary engine is disclosed. The embodiment illustrated in the figures is a fuel injected internal combustion engine with rotating members that orbit around and drive the rotor. The rotary engine 10 is adaptable to run on various fuels, including, but not limited to, gasoline and diesel. The rotary engine 10 is adaptable burn any type of fluid fuel either with a conventional spark, compression ignition, or other type of ignition system.

Figure 1:
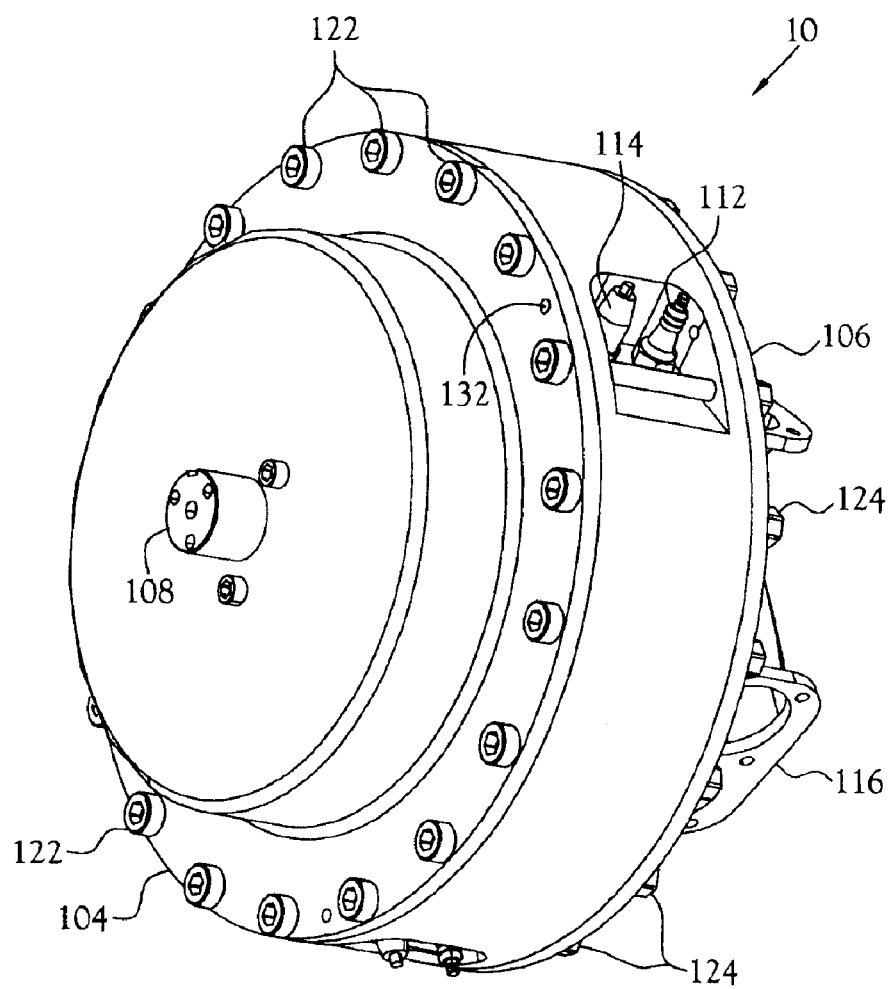
FIG. 1 is a perspective view of one embodiment of a rotary engine.

FIG. 1 illustrates a perspective view of one embodiment of a rotary engine 10. A housing 102 has a front cover 104 and a back plate 106. The front cover 104 and the back plate 106 are secured to the housing 102 by through-bolts 122 and corresponding nuts 124. A rotor shaft 108 extends from the front cover 104. Visible behind the back plate 106 is a manifold 116 for the intake and exhaust ports 502, 504. Also illustrated on the side of the housing 102 is one of the three spark plugs 112 and one of the three fuel injectors 114.

Figure 2:
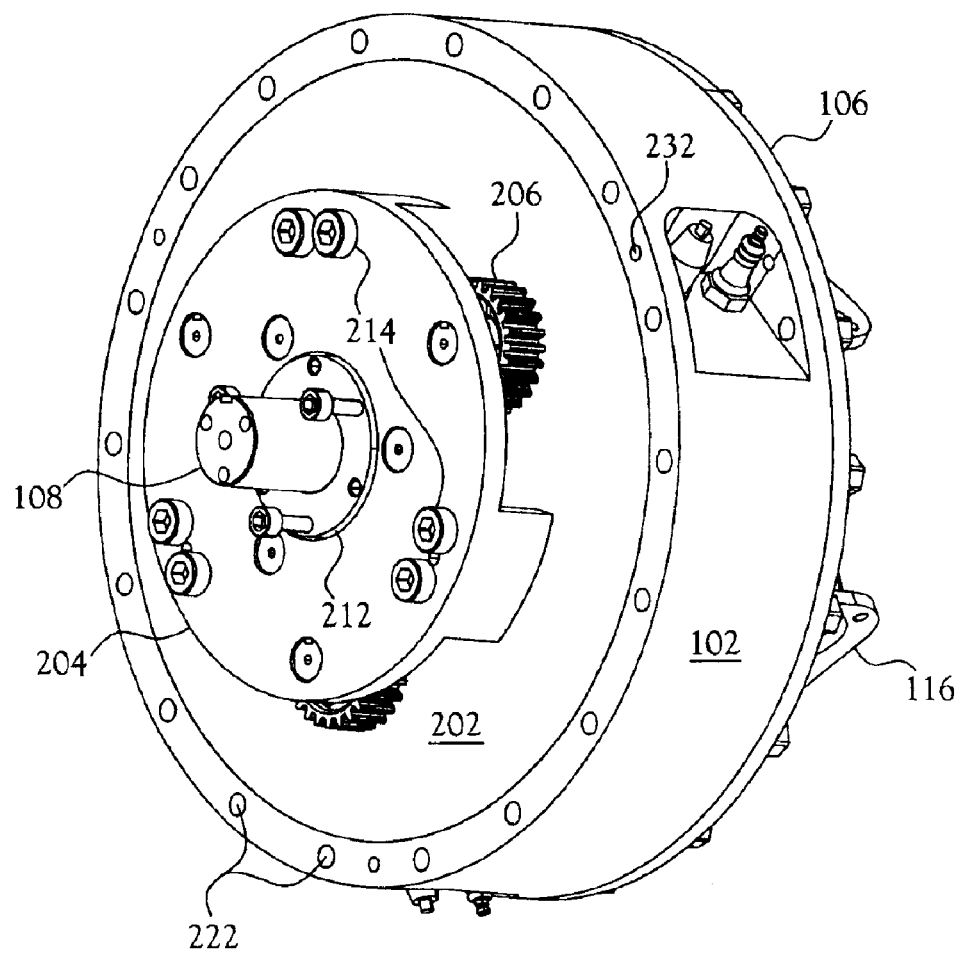
FIG. 2 is a perspective view of one embodiment of a rotary engine with the front cover removed.

FIG. 2 illustrates a perspective view of one embodiment of a rotary engine 10 with the front cover 104 removed. An idler plate 204 is attached to a front support plate 202 with fasteners 214. The assembly of the front support plate 202 and the idler plate 204 rotates with the rotor shaft 108 and supports the idler gear shafts to rotate with the rotor shaft 108. A sun gear mount 212 has an opening for the rotor shaft 108 and fits within an opening in the idler plate 204. The sun gear mount 212 is adapted to be fastened to the front cover 104 and is stationary relative to the housing 102. In one embodiment, the sun gear mount 212 includes a bearing supporting the rotor shaft 108.

Visible in FIG. 2 are the through-openings 222 for receiving the engine fasteners 122. Also visible are openings 232 in the housing 102 that correspond to openings 132 in the front cover 104. Alignment pins (not illustrated) inserted into the openings 232 aid in the assembly of the front cover 104 to the housing 102.

Figure 3:
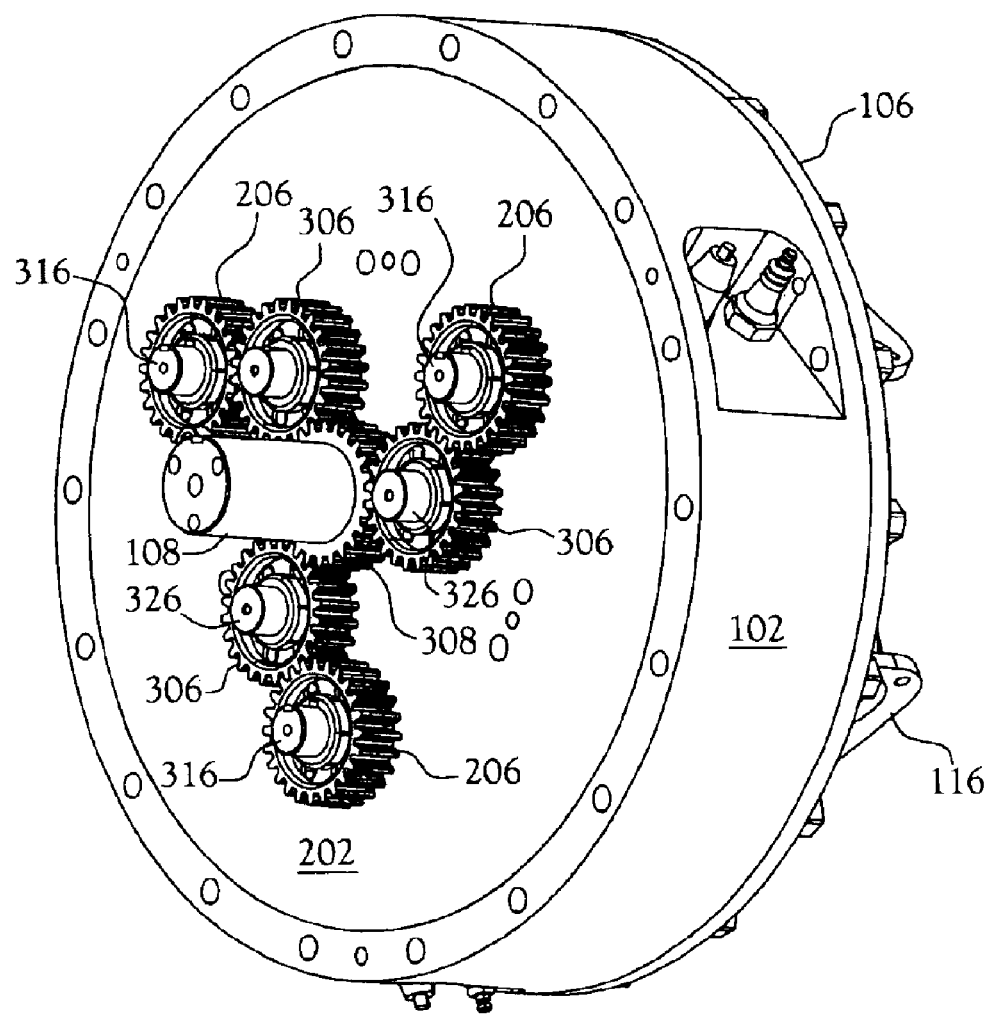
FIG. 3 is a perspective view of one embodiment of a rotary engine showing the planetary gear configuration.

FIG. 3 illustrates a perspective view of one embodiment of a rotary engine 10 showing the planetary gear assembly. In this view, the idler plate 204 and sun gear mount 212 have been removed, showing the three rotating member gears 206, the three idler gears 306, and the sun gear 308. In the illustrated embodiment, all the gears 206, 306, 308 have the same number of teeth. The sun gear 308 is stationary relative to the housing 102, and as the rotating member gears 206 orbit about the sun gear 308, the rotating member gears 206 maintain the same orientation, that is, the teeth of the rotating member gears 206 do not rotate relative to the teeth of the sun gear 308. In one embodiment, the sun gear 308 is secured to the sun gear mount 212. In another embodiment where the number of rotating members 1006 are not the same as the number of lobes 1112, the rotating member gears 206 rotate so as to ensure that the tips 1106 of the rotating members 1006 maintain contact with the lobes 1112 as the rotating members 1006 orbit the rotor shaft 108. Those skilled in the art will recognize that other mechanisms can be used to orbit the rotating members 1006 about the rotor 1002 without departing from the scope or spirit of the present invention.

A front support plate 202 rotates relative to the housing 102, but the plate 202 is stationary relative to the rotor shaft 108. The front support plate 202 has openings for the rotating member shafts 316, which carry the rotating member gears 206. In one embodiment, the rotating member shafts 316 engage bearings in the front support plate 202 and idler plate 204.

The plate 202 also supports the idler shafts 326, which carry the idler gears 306. In one embodiment, the idler shafts 326 are fixed in the front support plate 202 and idler plate 204, and the idler gears 306 rotate on the idler shafts 326. In another embodiment, the idler gears 306 are fixed to the idler shafts 326 and the idler shafts 326 engage bearings in the front support plate 202 and the idler plate 204.

Figure 4:
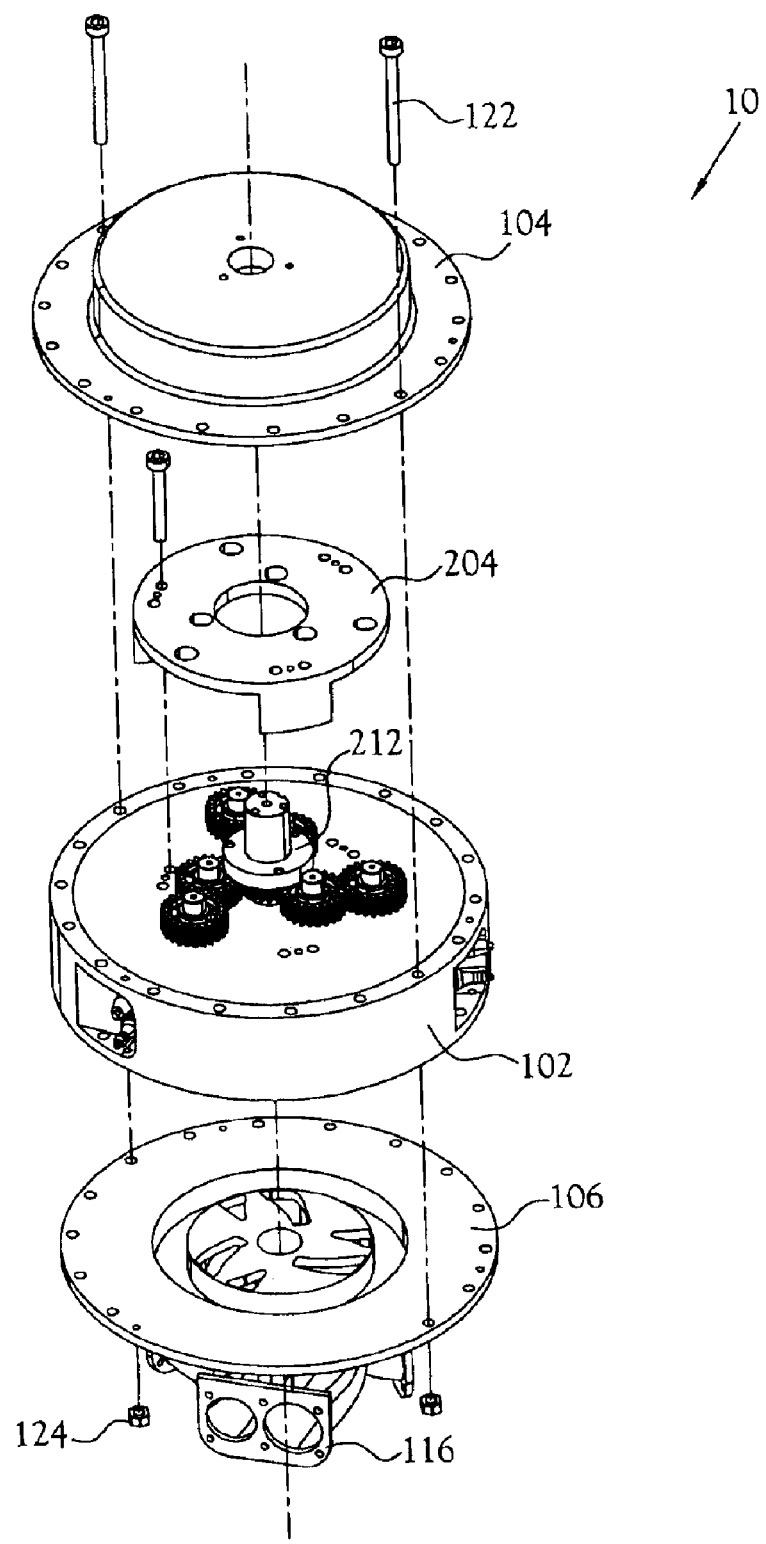
FIG. 4 is an exploded view of one embodiment of the rotary engine.

FIG. 4 illustrates an exploded view of one embodiment of the rotary engine 10 showing the front cover 104, the idler plate 204, the planetary gear configuration 206, 306, 308, the housing 102, the back plate 206, and the manifold 116. In one embodiment, the bolts 122 extend through the housing 102, connecting the front cover 104, the housing 102, and the back plate 106 by engaging the bolts 124. In other embodiments, the housing 102 includes studs or accepts bolts securing the front cover 104 and the back plate 206 to the housing 102.

Figure 5:
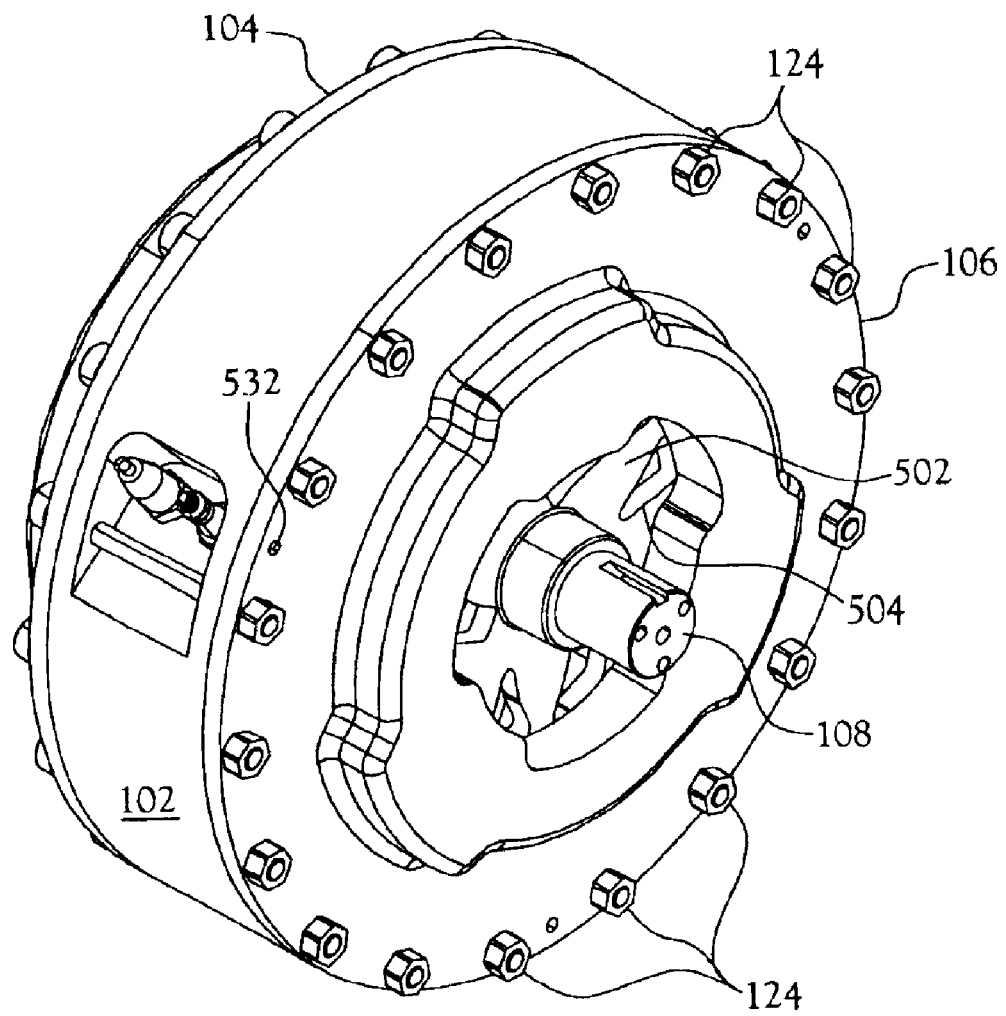
FIG. 5 is a perspective view of the rear of one embodiment of a rotary engine.
Figures 7, 8:
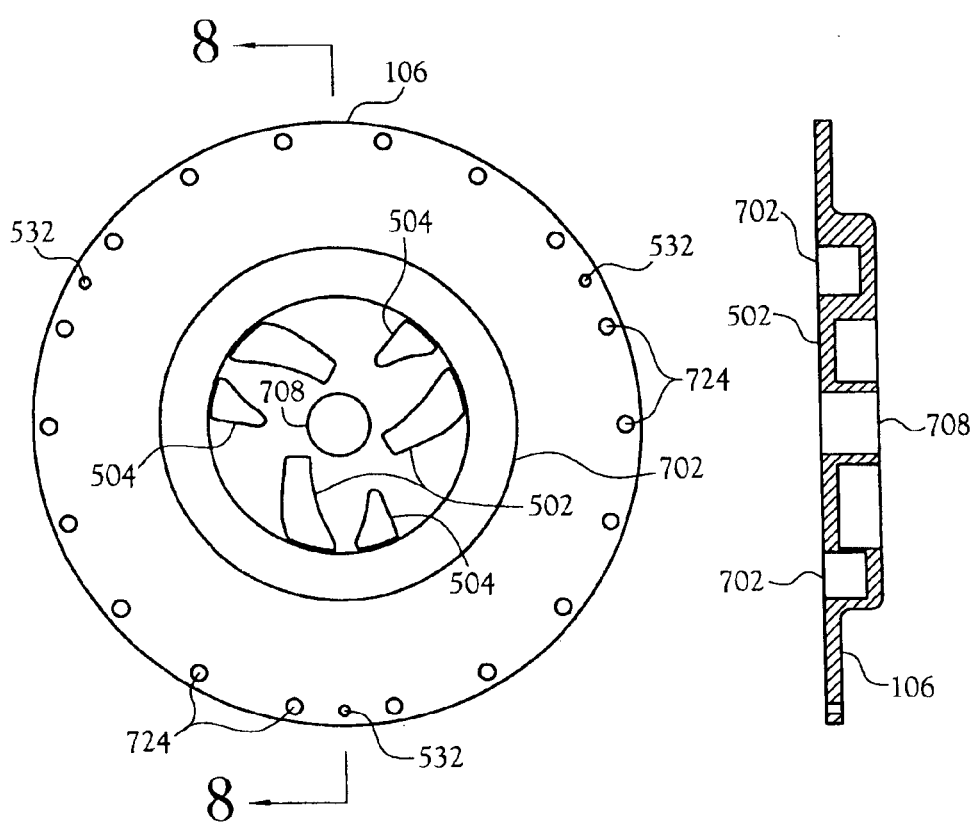
FIG. 7 is a perspective view of one embodiment of the back plate.
FIG. 8 is a cross-sectional view of one embodiment of the back plate.

FIG. 5 illustrates a perspective view of the rear of one embodiment of a rotary engine 10 with the manifold 116 removed. In the illustrated embodiment, the rotor shaft 108 extends through the back plate 106. Surrounding the rotor shaft 108 are the exhaust ports 502 and the inlet ports 504. FIG. 7 illustrates the back plate 106 and the arrangement of the ports 502, 504.

Figure 6:
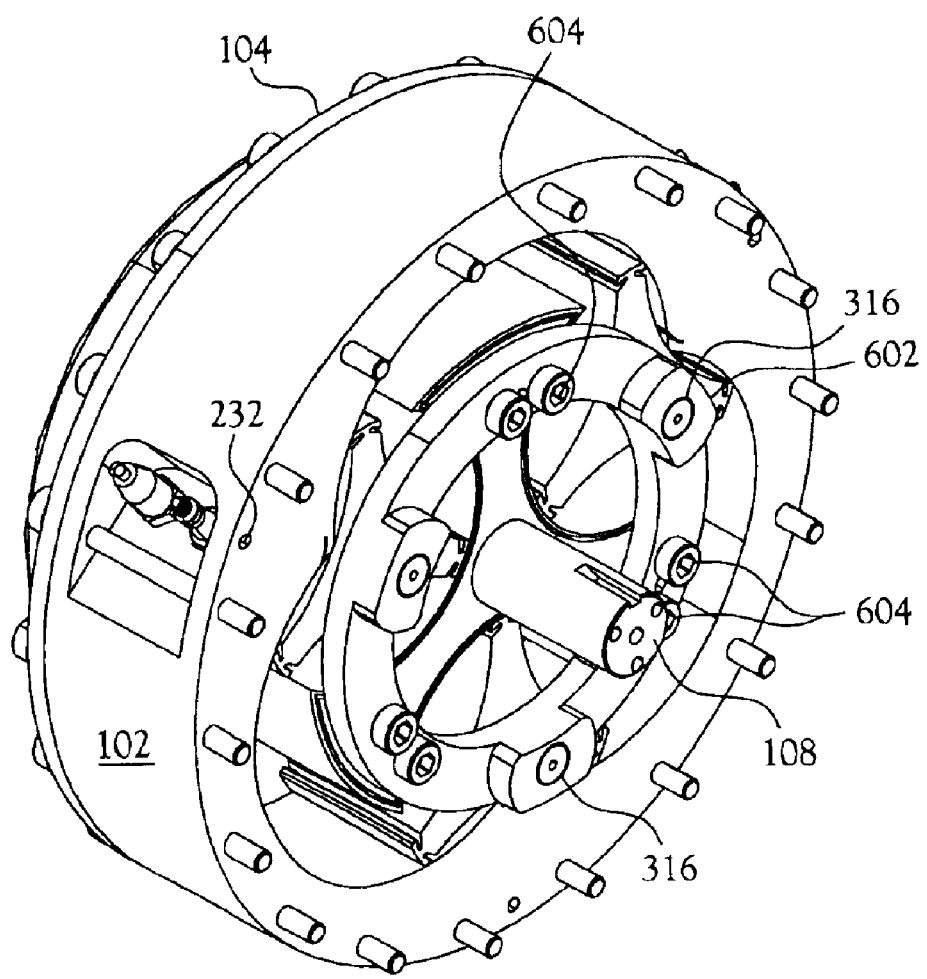
FIG. 6 is a perspective view of the rear of one embodiment of a rotary engine with the back plate removed.

FIG. 6 illustrates a perspective view of the rear of one embodiment of a rotary engine 10 with the back plate 106 removed. The back ring mount 602 has openings that receive the rotating member shafts 316. In one embodiment, the back ring mount 602 includes bearings for the rotating member shafts 316. The back ring mount 602 rotates with the rotor shaft 108. In the illustrated embodiment, fasteners 604 attach the back ring mount 602 to the rotor 1002.

Illustrated in FIG. 6 are the housing alignment holes 232 that, along with alignment pins (not illustrated), aid in aligning the back plate 106 with the housing 102.

FIG. 7 illustrates a perspective view of one embodiment of the back plate 106. FIG. 8 illustrates a cross-sectional view of one embodiment of the back plate 106. The back plate 106 is stationary with respect to the housing 102. Alignment holes 532 aid in aligning the back plate 106 with the housing 102. The back plate 106 includes through-openings 724 for the fasteners 122. The three exhaust ports 502 and the three inlet ports 504 are through-openings in the back plate 106. The back plate 106 also includes an opening 708 for passage of the rotor shaft 108. In one embodiment, the back plate 106 includes a bearing for the rotor shaft 108 as it passes through the opening 708.

The back plate 106 includes a channel 702 in which the back ring mount 602 rotates relative to the back plate 106. In one embodiment, the channel 702 provides clearance between the back ring mount 602 and the back plate 106.

Figure 9:
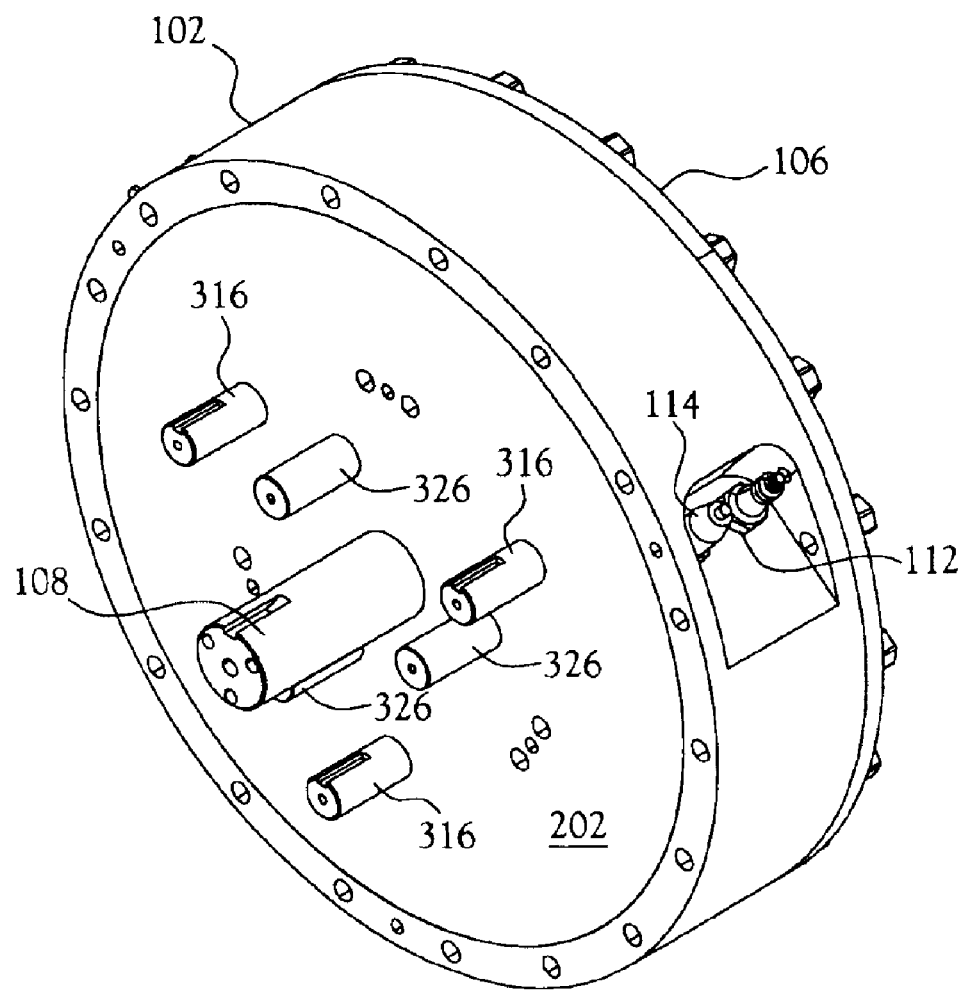
FIG. 9 is a perspective view of one embodiment of the rotary engine showing one embodiment of the front support plate.

FIG. 9 illustrates a perspective view of one embodiment of the rotary engine 10 showing one embodiment of the front support plate 202 without the planetary gear arrangement 206, 306, 308. The front support plate 202 is stationary with respect to the rotor shaft 108 and rotates with respect to the housing 102. In the illustrated embodiment, the front support plate 202 is attached to the rotor 1002 with bolts. One end of the rotating member shafts 316 and one end of the idler shafts 326 engage the front support plate 202. The other end of the idler shafts 326 engage the idler plate 204, which is secured to the front support plate 202.

Figure 10:
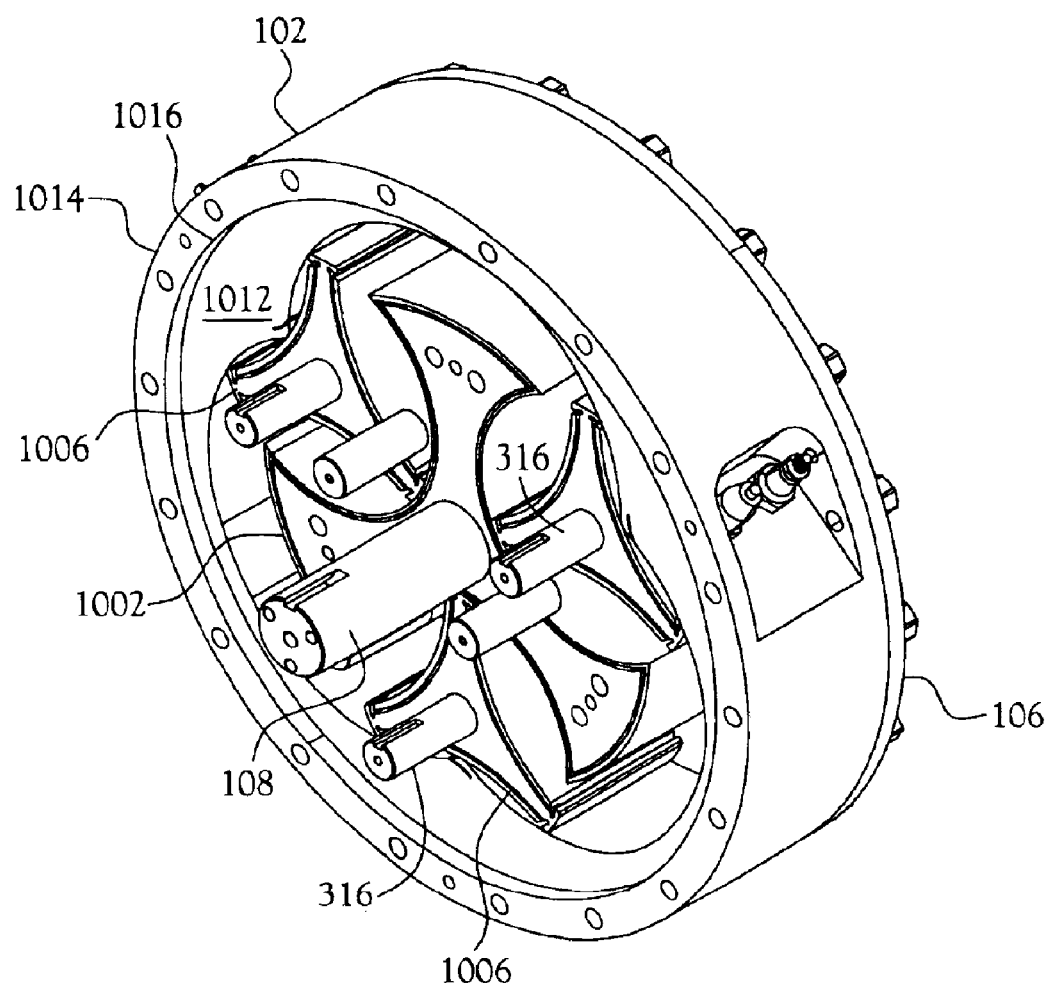
FIG. 10 is a perspective view of one embodiment of the rotating members and rotor of the rotary engine.
Figure 11:
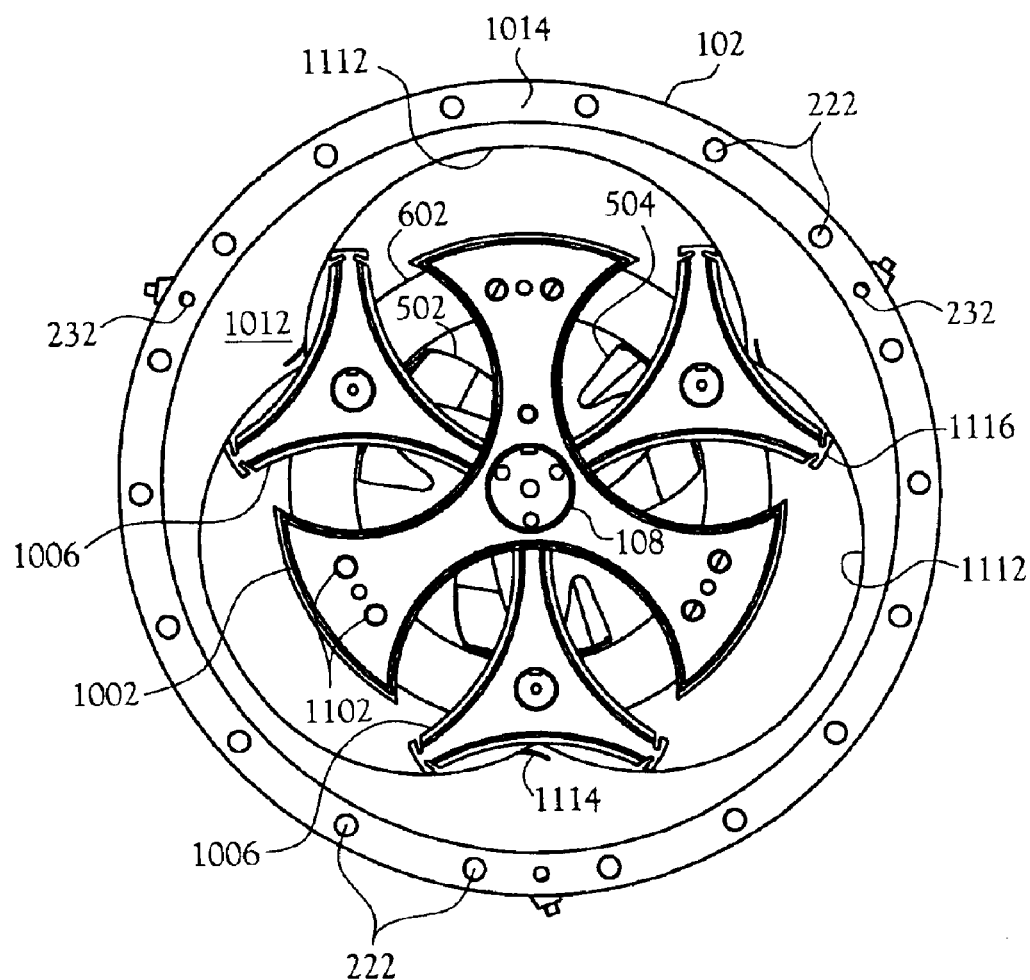
FIG. 11 is a front plan view of one embodiment of the rotating members and rotor of the rotary engine.

FIG. 10 illustrates a perspective view of one embodiment of the rotary engine 10 with the front support plate 202 removed, thereby showing the rotating members 1006 and rotor 1002 of the rotary engine 10. FIG. 11 illustrates a front plan view of one embodiment of the rotating members 1006 and rotor 1002 of the rotary engine 10. The housing 102 has a flange 1014 and a seating surface 1012. The flange 1014 is adapted to mate with the front cover 104. The through-openings 222 in the flange 1014 receive the through-bolts 122, and the alignment openings 232 receive alignment pins for positioning the front cover 104.

Adjacent the seating surface 1012 is the front support plate 202. The outside edge of front support plate 202 is adjacent the surface 1016, which is a radial surface between the flange 1014 and the seating surface 1012. In the illustrated embodiment, the front surface of the front support plate 202 is even with the front surface of the flange 1014.

Fixed to the rotor shaft 108 is a rotor 1002. The rotor 1002 is shown in detail in FIG. 13. The rotor 1002 is fixed to the front support plate 202 by fasteners inserted in openings 1102. The back side of the rotor 1002 is similarly attached to the back ring mount 602, which rotates in the channel 702 in the back plate 106. Accordingly, the rotor 1002, the rotor shaft 108, the front support plate 202, and the back ring mount 602 rotate as a unit.

Fixed to the rotating member shafts 316 are the rotating members 1006. The rotating members 1006 are shown in detail in FIG. 14. The rotating members 1006 revolve about the rotor shaft 108 and rotor 1002. In the illustrated embodiment, the rotating members 1006 have three vanes ending at points, or tips, 1116 that contact the inside surfaces, or lobes, 1112 of the housing 102. The back ring mount 602 is visible behind the rotor 1002 and the rotating members 1006. The back ring mount 602 fits into the channel 702 in the back plate 106.

Visible in FIG. 11 is the back plate 106 along with the exhaust ports 502 and the intake ports 504. As the rotor 1002 rotates relative to the back plate 106, the arms of the rotor 1002 and the vanes, or arms, of the rotating members 1006 progressively expose the exhaust ports 502 and the intake ports 504. The ports 502, 504 are discussed along with FIGS. 15A–F, which illustrate the operation of the engine 10.

In one embodiment, where the three lobes 1112 of the housing 102 connect to each other, seals 1114 are positioned. These seals 1114 are discussed along with FIG. 12.

Figure 12:
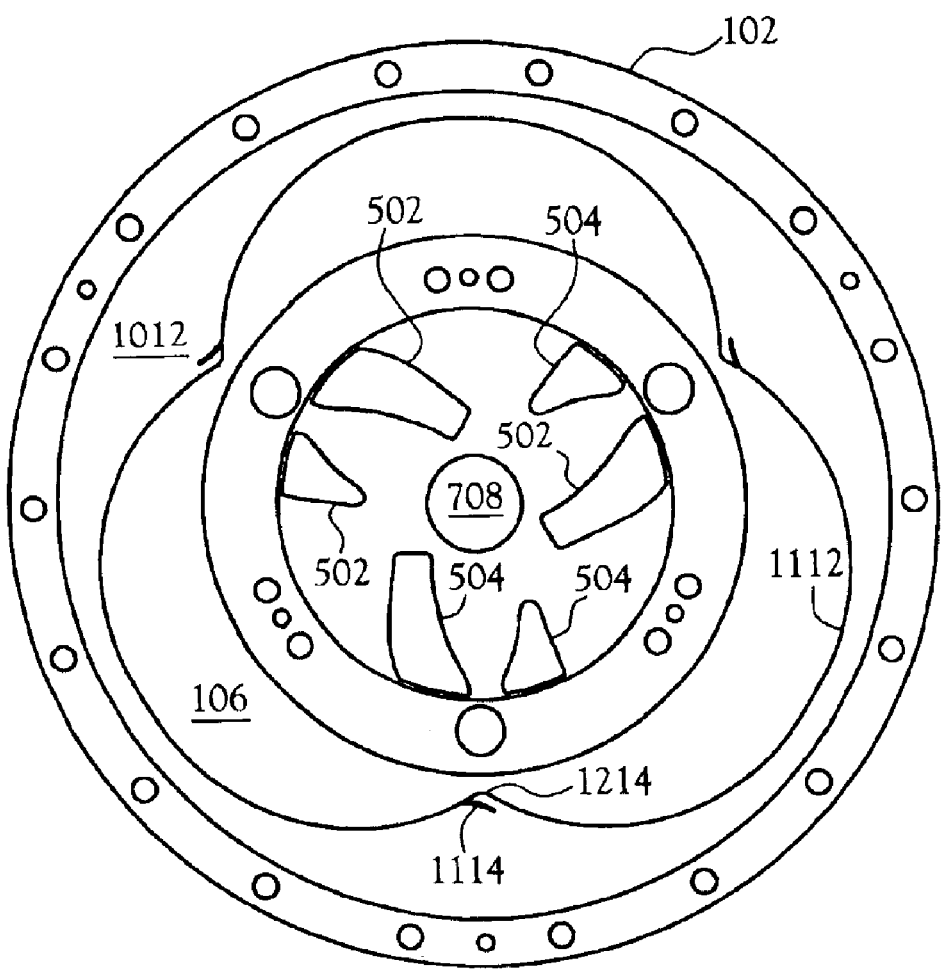
FIG. 12 is a front plan view of one embodiment of the housing and back plate of the rotary engine.

FIG. 12 illustrates a front plan view of one embodiment of the housing 102 and back plate 106 of the rotary engine 10. The three lobes 1112 of the housing 102 are visible. Each lobe 1112 is joined to its adjacent lobe 1112 at a peak 1214.

In the illustrated embodiment, where the three lobes 1112 of the housing 102 connect to each other are the seals 1114 that engage the outside radial surface 1304 of the rotor 1002 and prevent fluid communication between adjacent lobes 1112. The seals 1114 are formed by a slit in the trailing side of the peak 1214, as seen by the rotor 1002 as it rotates about the rotor shaft 108. The peaks 1214 are positioned from the center rotor shaft 108 such that the outer surface 1304 of the rotor 1002 contacts the peaks 1214. The slit allows the peak 1214 between the lobes 1112 to resiliently contact the radial surface 1304 of the rotor 1002. In one embodiment, the peaks 1214 have a concave surface that mates with the outer surface 1304 of the rotor 1002. Those skilled in the art will recognize that other types of seals can be used to provide a seal between the rotor 1002 and the peaks 1214 without departing from the spirit and scope of the present invention.

Figure 13:
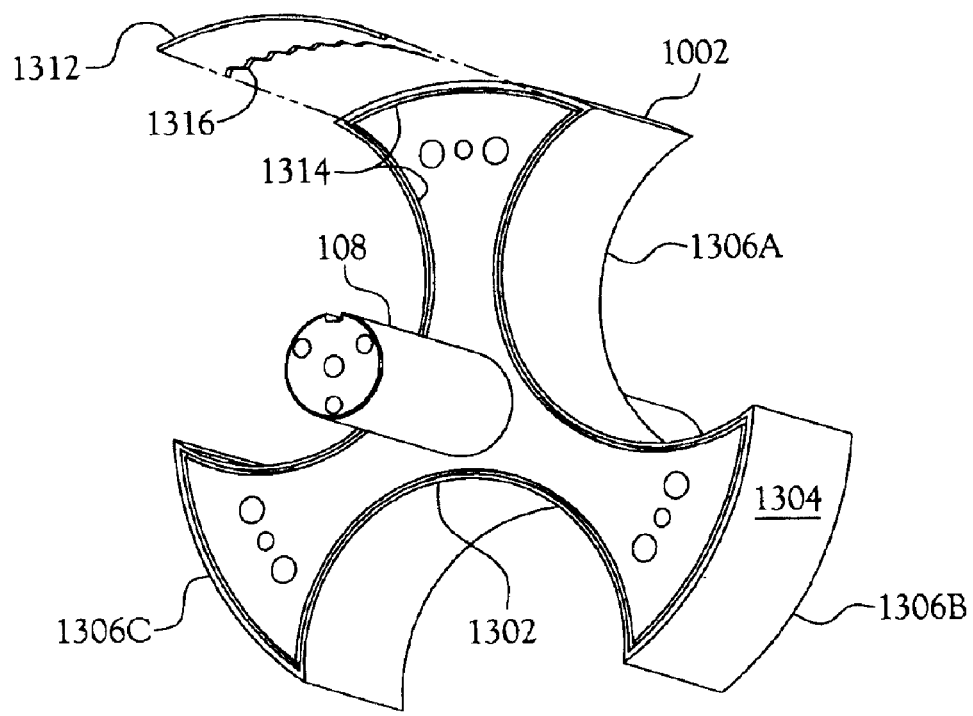
FIG. 13 is a perspective view of one embodiment of the rotor of the rotary engine.

FIG. 13 illustrates a perspective view of one embodiment of the rotor 1002 of the rotary engine 10. The rotor 1002 has a circular shape with three circular cutouts 1302 that define three arms 1306A, 1306B, 1306C. The portion of the circular shape not cutout forms three outer surfaces 1304. As the rotor 1002 rotates within the housing the three outer surfaces 1304 form a seal intermittently with the peaks 1214 of the housing 102. In the illustrated embodiment, the outer surfaces 1304 contact the peaks 1214 for a portion of the rotation of the rotor 1002. The three circular cutouts 1302 are sized to allow each rotating member 1006 to rotate within its respective cutout 1302. The three arms 1306 project radially from the center of the rotor 1002 and are separated by 120°. Those skilled in the art will recognize that the number of circular cutouts 1302 and arms 1306 can vary with the number of rotating members 1006 without departing from the spirit and scope of the present invention.

The front and back surface of the rotor 1002 have channels 1314 adjacent to the edge of the cutouts 1302 and the outer surfaces 1304. The channels 1314 receive a wave spring member 1316 and a sealing member 1312. The wave spring member 1316 is positioned in the bottom of the channel 1314 and the sealing member 1312 is positioned adjacent the wave spring member. The sealing member 1312 has a rectangular cross-section and has a top surface extending above the respective surface of the rotor 1002. The top surface of the sealing member 1312, by virtue of the wave spring member 1316, has sliding contact with the front support plate 202 or the back plate 106. In one embodiment, the wave spring member 1316 is a sheet of spring steel having a wave shape, and the member 1316 conforms to the curve of the channel 1314.

Figure 14:
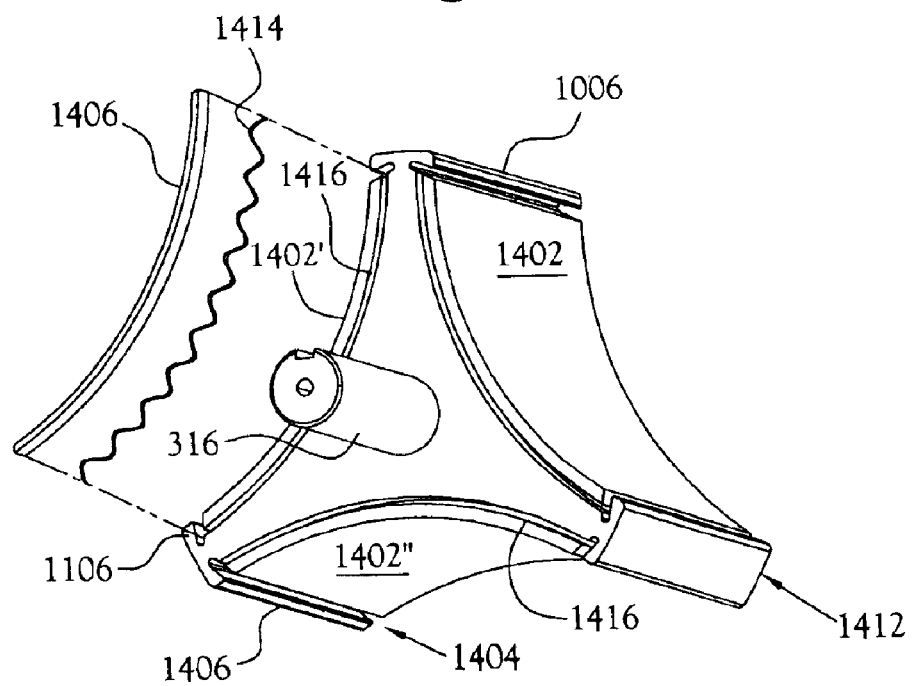
FIG. 14 is a perspective view of one embodiment of a rotating member of the rotary engine.

FIG. 14 illustrates a perspective view of one embodiment of a rotating member 1006 of the rotary engine 10. The rotating member 1006 has a symmetrical three-vaned configuration. The outer surface 1412 of the rotating member 1006, which forms the tip 1106, forms a portion of circle with the rotating member shaft 316 at the center. The outer surface 1412 at the tip 1106 contacts the cutout 1302 in the rotor 1002 as the rotating member 1006 rotates within the cutout 1302.

In the illustrated embodiment, each tip 1106 includes a seal formed by a pair of side lips 1406 with a slit 1404. The lip 1406 resiliently deforms upon contact with the lobes 1112 by virtue of the slit 1404 allowing the lip 1406 to deflect toward the rotating member shaft 316. Those skilled in the art will recognize that the type of seal at the tips 1106 can vary without departing from the spirit and scope of the invention.

Between the tips 1106 are the side surfaces 1402 of the rotating member 1006. The side surfaces 1402 are arcuate surfaces and have a contour to provide clearance from the peaks 1124 when the rotating members 1006 are in the position illustrated in FIG. 11. The shape of the contour contributes to the combustion parameters, including compression ratio.

The front and back surface of the rotating member 1006 have channels 1416 along the rotating member sides 1402. The channels 1416 receive a wave spring member 1414 and a sealing member 1406. The wave spring member 1414 is positioned in the bottom of the channel 1416 and the sealing member 1406 is positioned adjacent the wave spring member 1414. The sealing member 1416 has a rectangular cross-section and has a top surface extending above the respective surface of the rotating member 1006. The top surface of the sealing member 1416, by virtue of the wave spring member 1414, has sliding contact with the front support plate 202 or the back plate 106 and back ring mount 602. In one embodiment, the wave spring member 1414 is a sheet of spring steel having a wave shape, and the member 1414 conforms to the curve of the channel 1416.

Figures 15A, 15B:
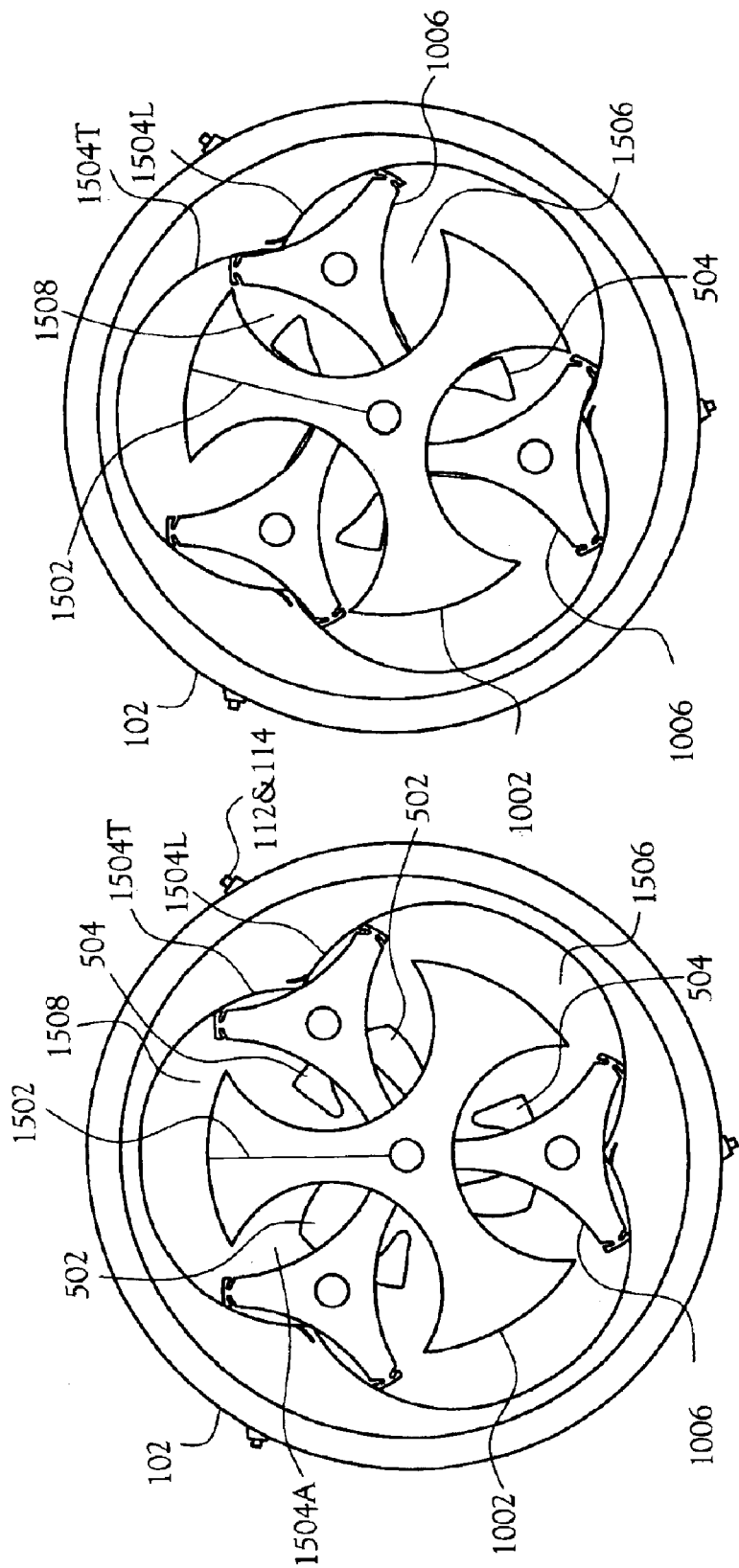

FIGS. 15A–F illustrate the rotor 1002 and rotating members 1006 rotating through one firing cycle. In the figures, the rotor 1002 rotates clockwise and the rotating members 1006 do not rotate relative to the housing 102, but the rotating members 1006 orbit around the center of the rotor 1002. In the illustrated embodiment, each rotating member 1006 does not rotate about its centerline, but remains oriented parallel to its starting position while translating with the circular locus of the shaft 316 motion. Each rotating member 1006 defines three fluid chambers 1504, 1506, 1508 corresponding to one of the three side surfaces 1402 of each rotating member 1006. A reference line 1502 illustrates the top-dead-center position of the rotor 1002. Top-dead-center is defined as the position of the rotor 1002 with any rotating member 1006 positioned such that a fluid chamber has its minimum volume. In FIG. 15A, the rotating member 1006 fluid chamber 1504 is at its minimum volume with the rotor 1002 in the illustrated position. For the illustrated embodiment, the rotor 1002 has three top-dead-center positions located 120° apart.

The rotor 1006 rotates 120° between each top-dead-center position. During that 120° rotation, one side of each of the three rotating members 1006 undergoes a power cycle 1616. As the power cycle 1616 progresses on the side 1402 of the rotating member 1006 that is trailing, the intake cycle 1612 and the compression cycle 1614 are progressing on the side 1402 of the rotating member 1006 that is leading. Accordingly, the following discussion of FIGS. 15A–F applies to each of the components that are illustrated in triplicate, such as the three rotating members 1006, the three inlet ports 504, the three outlet, or exhaust, ports 502, the three spark plugs 112, and the three fuel injectors 114.

Internal combustion engines require four cycles for operation: an intake cycle 1612, a compression cycle 1614, a power cycle 1616, and an exhaust cycle 1618. Each stroke of a four stroke reciprocating piston internal combustion engine accomplishes one of these cycles and requires four strokes for every power cycle 1616. For a four stroke engine, the crankshaft rotates twice for every power cycle 1616 for a single piston. A two-stroke reciprocating piston internal combustion engine requires two strokes for every power cycle 1616 and the crankshaft rotates once for every power cycle 1616 for a single piston. The rotary engine 10 does not have reciprocating pistons. Instead, the rotating members 1006 of the rotary engine 10 engage a rotor 1002, which rotates with the rotating members 1006 in orbit about the rotor 1002. The planetary motion of the rotating members 1006, in combination with the rotor 1002 and the lobes 1112, accomplishes the four cycles 1612, 1614, 1616, 1618 with each rotating member 1006 having three power cycles 1616 for every rotation of the rotor 1002. The following discussion begins with the power cycle 1616 and describes the operation of the rotary engine 10.

FIG. 15A illustrates the rotor 1002 and rotating members 1006 at top-dead-center. The rotor 1002 has three top-deadcenter positions separated by 120°. The first fluid chamber 1504 is adjacent the peak 1214 between two lobes 1112. The volume between the peak 1214 and the leading tip 1116 of the rotating member 1006 is the leading fluid chamber 1504L, and the volume between the trailing tip 1116 of the rotating member 1006 and the peak 1214 is the trailing fluid chamber 1504T.

In the illustrated position, air has passed from the intake port 504 and has been compressed between the rotating member 1006 and the housing 102 in the leading fluid chamber 1504L and the trailing fluid chamber 1504T. In one embodiment, the fuel injector 114 injects the fuel into the compressed air in the leading fluid chamber 1504L at top-dead-center and the spark plug 112 then fires, igniting the fuel-air mixture in the leading fluid chamber 1504L. In another embodiment, the fuel injector 114 injects the fuel and the spark plug 112 fires within a few degrees of top-dead-center.

FIG. 15B illustrates the rotor 1002 after it rotates 20 degrees clockwise. The compressed inlet gas in the trailing fluid chamber 1504T is forced rapidly into the leading fluid chamber 1504L across the housing peak 1214, thereby causing turbulence in the leading fluid chamber 1504L, which increases efficiency and promotes more rapid fuel combustion rates. The combustion gas in the leading fluid chamber 1504L expands, causing the rotating member 1006 to force the rotor 1002 to rotate clockwise. It should be noted that there is a positive torque vector generated at top-dead-center, unlike a reciprocating piston engine or any engine designed with an eccentric crankshaft, such as the Wankel engine. This promotes higher efficiency due to greatly reduced pumping in the engine prior to top-dead-center.

FIG. 15C illustrates the rotor 1002 after it rotates another 20 degrees clockwise. The gas in the trailing fluid chamber 1504T has combined with the leading fluid chamber 1504L into a single fluid chamber 1504. The combustion gas continues expanding in fluid chamber 1504, applying pressure to the side wall 1402 of the rotating member 1006 and forcing the rotor 1002 to continue rotating clockwise.

FIG. 15D illustrates the rotor 1002 after it rotates another 20 degrees clockwise. The combustion gas continues expanding in fluid chamber 1504.

FIG. 15E illustrates the rotor 1002 after it rotates another 20 degrees clockwise, and the power cycle started with the rotor 1002 at top-dead-center begins to end. The rotor 1002 has uncovered the exhaust port 502 and a gap will appear between the trailing edge of the rotor 1002 and the adjacent trailing rotating member 1006 after the rotor 1002 rotates a few more degrees. This gap allows the combustion gas in fluid chamber 1504 to flow to the exhaust port 502, thereby beginning the exhaust cycle.

FIG. 15F illustrates the rotor 1002 after it rotates another 20 degrees clockwise. The exhaust cycle continues and the intake cycle begins. The inlet port 504 is exposed by the rotor 1002, allowing fresh air to enter the fluid chamber 1504. The intake air begins to scavenge the exhaust gas across the fluid chamber 1504 to the fluid chamber 1506A of the adjacent rotating member 1006.

Referring back to FIG. 15A, with the rotor 1002 in the top-dead-center position, the openings connecting the fluid chamber 1508 with the fluid chamber 1506A are equal. The exhaust gas is being scavenged with the intake gas flowing counterclockwise from the inlet port 504 in fluid chamber 1508 to the exhaust port 502 in fluid chamber 1506A. With the rotor 1002 in this position, the exhaust cycle 1618 and the intake cycle 1612 continue.

Referring back to FIG. 15B, the exhaust port 502 has just been covered by the rotating member 1006. With the exhaust port 502 covered, the exhaust cycle 1618 is completed. The intake cycle 1612 is also coming to an end as the rotor 1002 and the rotating member 1006 close the fluid communication between the inlet port 504 and the fluid chamber 1506.

Referring back to FIG. 15C, the intake cycle 1612 is complete and the compression cycle 1614 begins for the next power cycle 1618. The fluid chamber 1506 is now a closed chamber with a decreasing volume as the rotor 1002 continues clockwise. The fluid chamber 1508 is open to the exhaust port 502 and is bounded by the rotor wall 1302 and the rotating member side wall 1402. The gas in the fluid chamber 1508 provides cooling of the rotor 1002 and the rotating member 1006.

Referring back to FIG. 15D, the compression cycle 1614 continues as the volume of the fluid chamber 1506 continues to decrease. The fluid chamber 1508 is open to both the exhaust port 502 and the inlet port 504. The gas in the fluid chamber 1508 provides cooling of the rotor 1002 and the rotating member 1006.

Referring back to FIG. 15E, the compression cycle 1614 is almost complete. The inlet port 504 is covered by the rotating member 1006. The exhaust port 502 is being uncovered by the rotor 1002 in the fluid chamber 1508.

Referring back to FIG. 15F, the compressed gas in the fluid chamber 1506 is divided between the trailing chamber 1506T and the leading chamber 1506L, which are divided by the peak 1214. In one embodiment the peak 1214 does not contact the side 1402 of the rotating member 1006 such that the compressed gas is prevented from flowing between the chambers 1506T, 1506L. The fluid chamber 1504 is about to connect to the fluid chamber 1506A after the rotating member tip 1106 loses contact with the rotor wall 1302. The combustion gas in the fluid chamber 1504 will then move into the fluid chamber 1506A where it will exhaust through the exhaust port 502. The inlet ports 504 are not yet exposed. The rotor 1002 continues rotating clockwise to the top-dead-center position, where the next sequence of cycles begins again.

As is apparent from the above discussion, for each complete revolution of the rotor 1002, there are nine power cycles 1616. Each of the three rotating members 1006 have three power cycles 1616 for every revolution of the rotor 1002. Because the rotating members 1006 are equally spaced about the rotor 1002, the forces developed during the power cycles 1616 are balanced about the rotor 1002.

In operation, the rotor 1002 rotates clockwise, and the rotor outer surfaces 1304, as they contact the peaks 1214, provide a seal between adjacent fluid chambers 1504, 1506, 1508. The rotating members 1006 rotate, relative to the rotor 1002, counterclockwise. The tips 1106 of the rotating members 1006, as they contact the lobes 1112, provide a seal between adjacent fluid chambers 1504, 1506, 1508. The planetary gear assembly 206, 306, 308 ensures that the rotating members 1006 move with the proper relationship with the rotor 1002.

Figure 16:
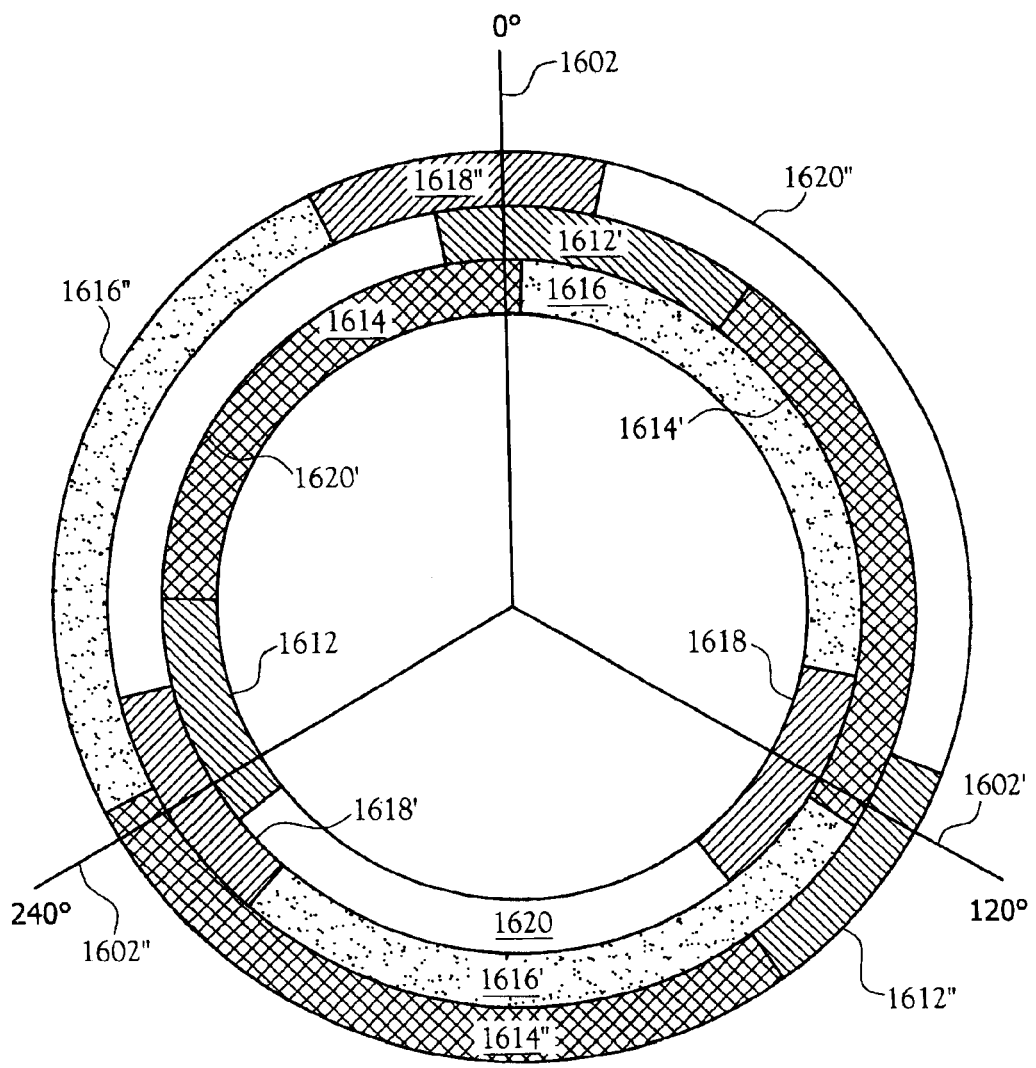
FIG. 16 is a pictorial view of the four internal combustion cycles.

FIG. 16 illustrates the four internal combustion cycles for a single rotating member 1006 with three side surfaces 1402 as the rotating member 1006 orbits a full 360° around the rotor 1002. Three concentric rings represent the cycles for each of the side surfaces 1402, 1402', 1402" of a rotating member 1006. The four cycles include the intake cycle 1612, the compression cycle 1614, the power cycle 1616, and the exhaust cycle 1618. The exhaust cycle 1618 and the intake cycle 1612 are separated by a dead zone 1620 when the side surface 1402 of the rotating member 1006 faces the cutout region 1302 of the rotor 1002. FIG. 16 depicts the 360° rotation of the rotor 1002, showing top-dead-center 1602. 1602', 1602" at 0°, 120°, and 240°. Referring to FIG. 15A, top-dead-center is with the rotor 1002 oriented with the outer surfaces 1304 centered in the lobes 1112. The following discussion applies to a single side surface 1402 of a rotating member, which for illustration purposes forms one boundary of the fluid chamber 1504. It should be remembered that the four internal combustion cycles 1612, 1614, 1616, 1618 repeat for each rotating member 1006 and that these cycles 1612, 1614, 1616, 1618 repeat for every 120° rotation of the rotor 1002 because each rotating member 1006 has three side surfaces 1402 separated by 120°. Accordingly, these cycles 1612, 1614, 1616, 1618 will repeat nine times for each revolution of the rotor 1002.

The intake cycle 1612 begins approximately 140° before top-dead-center. The intake cycle 1612 begins when the rotating member 1002 uncovers the inlet ports 504, thereby allowing gas to enter the chamber. The inlet ports 504 are uncovered by the rotating members 1006 as the rotor 1002 rotates from the position illustrated in FIG. 15F to the position illustrated in FIG. 15A. The intake cycle 1612 completes when the inlet ports 504 are covered by the rotor 1002 as the rotor 1002 rotates from the position illustrated in FIG. 15A to the position illustrated in FIG. 15B.

After completion of the intake cycle 1612, the compression cycle 1614 begins. The compression cycle 1614 is completed when the rotor 1002 is at or near top-dead-center 1602. At this point, the gas is compressed in a chamber 1504 containing, in one embodiment, the fuel injector 114 and spark plug 112, and in another embodiment, just the spark plug 112, and in still another embodiment, without a spark plug 112 when the power cycle 1616 is initiated with compressive ignition.

The power cycle 1616 begins, in various embodiments, near top-dead-center 1602 and continues until the rotor 1002 rotates approximately 70° from top-dead-center. At that point, the exhaust cycle 1618 begins. The exhaust cycle 1618 continues until the rotor 1002 rotates approximately 140° from top-dead-center. The exhaust cycle 1618 is completed when the exhaust port 502 is covered by the rotating member 1006 as the rotor 1002 rotates from the position illustrated in FIG. 15F to the position illustrated in FIG. 15A. The location of the exhaust ports 502 in relation to the inlet ports 504 are such that the exhaust ports 502 are uncovered before the inlet ports 504 are exposed. In this manner, the pressurized combustion gas can only flow out of the exhaust ports 502. As the rotor 1002 rotates, the inlet ports 504 are exposed and the intake gas flows into the chamber. The inertia of the combustion gas exiting the exhaust ports 502 helps draw the intake gas through the inlet ports 504. The flow from the inlet ports 504 aids in scavenging the combustion gas out the exhaust ports 502. Those skilled in the art will recognize that the location of the exhaust and inlet ports 502, 504 can vary, thereby changing the amount of rotation of the rotor 1002 for each internal combustion cycle 1612, 1614, 1616, 1618 without departing from the spirit and scope of the present invention.

The above discussion applies to a single side surface 1402. FIG. 16 illustrates the four internal combustion cycles 1612, 1614, 1616, 1618 for each side surface 1402, 1402', 1402" for a single rotating member 1006. The rotating member has three side surfaces 1402, 1402', 1402" and each side surface 1402, 1402', 1402" experiences all four internal combustion cycles 1612, 1614, 1616, 1618 in sequence. During a portion of the time that a first side surface 1402 is undergoing the intake cycle 1612, an adjacent second side surface 1402' is undergoing the exhaust cycle 1618'. Because the two side surfaces 1402, 1402' share connected fluid chambers 1508, 1504A, scavenging of the combustion gas draws intake air into the chamber 1508 while the combustion gas is exhausted from chamber 1504A.

After first side surface 1402 begins the power cycle 1616, the adjacent second side surface 1402' completes its intake cycle 1612' and begins a compression cycle 1614'. After the first side surface 1402 begins its exhaust cycle 1618, the adjacent third side surface 1402" begins its intake cycle 1612". Each side surface 1402, 1402', 1402" sequentially undergoes an intake cycle 1612, 1612', 1612"; a compression cycle 1614, 1614', 1614"; a power cycle 1616, 1616', 1616"; and an exhaust cycle 1618, 1618', 1618". Because of the relationship of the side surfaces 1402, 1402', 1402" to each other and to the rotor 1002 and housing 102, the intake cycles 1612, 1612', 1612" and the exhaust cycles 1618, 1618', 1618" overlap, thereby allowing scavenging to occur.

As can be seen in FIG. 16, one side surface 1402 undergoes the power cycle 1616 and the exhaust cycle 1618 while the adjacent side surface 1402' undergoes the intake cycle 1612' and the compression cycle 1614', all within a 120° rotation of the rotor 1002. If the power cycle 1616, 1616', 1616" begins at top-dead-center of the rotor 1002, then the power cycle 1616 and the exhaust cycle 1618 on one side surface 1402 and the intake cycle 1612' and the compression cycle 1614' on the adjacent side surface 1402' occur as the rotor 1002 travels from a first top-dead-center position 1602 to a second top-dead-center position 1602'. In another embodiment, the power cycle 1616, 1616', 1616" begins at a point other than top-dead-center, for example, when the spark is advanced or retarded.

As the second side surface 1402' moves with rotor 1002 from one top-dead-center position 1602, through a second top-dead-center position 1602', to a third top-dead-center position 1602", the second side surface 1402' undergoes a portion of the intake cycle 1612', the compression cycle 1614', the power cycle 1616', and a portion of the exhaust cycle 1618'. That is, when the rotor 1002 has an angular displacement equal to twice the displacement of the adjacent top-dead-center positions 1602, 1602', 1602", one side surface 1402 of the rotating member 1006 undergoes at least a portion of all four cycles 1612, 1614, 1616, 1618.

It bears noting that in the illustrated embodiment, fuel injectors 114 provide fuel to the compressed gas before combustion is initiated by the spark plugs 112. Accordingly, scavenging of the combustion gas by air flow from the inlet ports 504 does not involve any fuel. That is, air flowing into the inlet ports 504 mixes with the combustion gas and exits the exhaust ports 502 with the combustion gas as part of scavenging. Because the fuel has not yet been injected at the time of scavenging, no fuel (other than that due to incomplete combustion) exits through the exhaust ports 502. In another embodiment, the inlet ports 504 receive an air-fuel mixture and a fuel injector 114 is not necessary.

The rotary engine 10 includes various functions. The function of introducing fuel is implemented, in one embodiment, by the fuel injectors 114. In another embodiment, the function of introducing a fuel into the intake air is implemented by the intake air passing through a carburetor that mixes fuel with the intake air. The function of igniting the fuel is implemented, in one embodiment, by the spark plugs 112. In another embodiment, the function of igniting the fuel is implemented by compressive ignition when the rotating member 1006 compresses the air-fuel mixture.

The function of orbiting the rotating members 1006 about the rotor 1002 while maintaining at least one tip 1106 of the rotating member 1006 in contact with the surface of the lobe 1112 is implemented, in one embodiment, by the planetary gears 206, 307, 308. Those skilled in the art will recognize that other mechanisms can be used to orbit the rotating members 1006 about the rotor 1002 without departing from the scope or spirit of the present invention.

The function of sealing the tips 1406 of the rotating members 1006 is implemented, in one embodiment, by the pair of side lips 1406 with a slit 1404, as illustrated in FIG. 14. The function of sealing the rotor 1002 is implemented, in one embodiment, by the rotor 1002 having channels 1314 on the front and back of the rotor 1002. Each channel 1314 receives a wave spring member 1316 and a sealing member 1312. The function of sealing the rotating members 1006 is implemented, in one embodiment, by each rotating member 1006 having channels 1416 on the front and back of the rotating member 1006. Each channel 1416 receives a wave spring member 1414 and a sealing member 1406. The function of sealing the peaks 1214 is implemented, in one embodiment, by the seals 1114 formed by a slit protruding into the trailing side of the peak 1214.

The function of drawing intake air is implemented, in one embodiment, by the rotor 1002 and rotating members 1006 rotating in the housing 102 such that the inlet ports 504 are exposed and intake air is drawn into the housing 102. The intake air is drawn into the chamber 1508 through the effects of scavenging. That is, as the combustion gas escapes through the exhaust ports 502, the inertia of the flowing combustion gas reduces the pressure over the inlet ports 504, thereby drawing the intake air into the chamber 1508. The intake cycle 1612 is described above with respect to FIG. 16.

The function of compressing the air is implemented, in one embodiment, by the rotating member 1006 compressing the intake air against the lobes 1112 of the housing 102. The compression cycle 1614 is described above with respect to FIG. 16.

The function of introducing a fuel into the intake air is implemented, in one embodiment, by the fuel injectors 114 when the rotating member 1006 has compressed the intake air. In another embodiment, the function of introducing a fuel into the intake air is implemented by the intake air passing through a carburetor that mixes fuel with the intake air.

The function of combusting the air and the fuel is implemented, in one embodiment, by the spark plugs 112 igniting the air-fuel mixture. In another embodiment, combustion occurs when the air-fuel mixture is compressed to the point where compressive ignition occurs. The power cycle 1616 is described above with respect to FIG. 16.

The function of exhausting the combusted air and fuel is implemented, in one embodiment, by the rotor 1002 and the rotating member 1006 rotating in the housing 102 such that the exhaust ports 502 are exposed and the combustion gas is exhausted from the housing 102. The exhaust cycle 1618 is described above with respect to FIG. 16.

The function of obtaining rotary motion from the combustion is implemented, in one embodiment, by the shaft 316 of the rotating member 1006 engaging the front support plate 202 and to the rear ring 602, which are connected to the rotor 1002. Pressure from the combustion gas is applied to the side 1402 of the rotating member 1006 and this pressure is transferred to the rotating member shaft 316, which transfers the force to the front support plate 202 and to the rear ring 602, which causes the rotor 1002 to rotate.

The function of sealing the rotary engine 10 is implemented, in various embodiments, by the various seals. There is a seal 1114 between the rotor 1002 and the peak 1214. There is a seal 1312, 1316, 1314 between the sides of the rotor 1002 and the back plate 106 and the front support plate 202. There is a seal 1406, 1414, 1416 between the front and back of the rotating member 1006 and the back plate 106 and the front support plate 202. There is a seal 1404, 1406 at each tip 1106 of the rotating member 1006.

From the foregoing description, it will be recognized by those skilled in the art that a rotary engine 10 has been provided. The illustrated embodiment shows three rotating members 1006 interfacing with three lobes 1112 in the housing. In other embodiments, either or both the number of rotating members 1006 and the number of lobes 1112 varies.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A rotary engine providing internal combustion of a fuel, said rotary engine comprising:

a housing having a sidewall, an inside surface of said sidewall having a plurality of lobes, adjacent ones of said at least two lobes are separated by a peak;

a rotor having a shaft and at least one circular cutout region, said rotor rotatable within said housing, said rotor forming a seal with each said peak intermittently when said rotor rotates within said housing, said rotor having a first top-dead-center position and a second top-dead-center position; and at least one rotating member, each of said at least one rotating member rotatable within a corresponding one of said at least one circular cutout region in said rotor, each said rotating member having a plurality of tips equally spaced around said at least one rotating member, at least one of said plurality of tips contacting one of said plurality of lobes as said rotor rotates within said housing, adjacent ones of said plurality of tips separated by a side surface, a trailing one of said side surface forming a combustion chamber when said adjacent ones of said plurality of tips contact said inside surface of said housing, said trailing one of said side surfaces sequentially performing a power cycle and at least a portion of an exhaust cycle and a leading one of said side surfaces sequentially performing at least a portion of an intake cycle and a compression cycle when said rotor rotates through an angle equal to an angular separation from said first top-dead-center position to said second top-dead-center position.

2. The rotary engine of claim 1 wherein said first top-dead-center position occurs when one of said at least one circular cutout regions is centered about one of said peaks and said second top-dead-center position occurs when said one of said at least one circular cutout regions is centered about another one of said peaks.

3. The rotary engine of claim 1 wherein said housing further includes a back plate having an exhaust port and an inlet port for each of said at least one rotating member.

4. The rotary engine of claim 1 wherein said housing further includes a back plate and a front plate, said front plate having a back surface facing said back plate, wherein said front plate, said back plate, and said sidewall form a cavity in said housing in which said rotor rotates and carries said at least one rotating member.

5. The rotary engine of claim 1 further including a back ring mount receiving each said rotating member shaft opposite said rotating member gear, said back ring received by a channel in a back plate attached to said housing.

6. The rotary engine of claim 1 further including as assembly whereby said at least one rotating member orbits about said rotor while maintaining at least one tip of said at least one rotating member in contact with said plurality of lobes.

7. The rotary engine of claim 1 further including a means for orbiting said at least one rotating member about said rotor while maintaining at least one tip of said at least one rotating member in contact with said plurality of lobes.

8. A rotary engine providing internal combustion of a fuel, said rotary engine comprising:
   a housing having a housing sidewall, an inside surface of said housing sidewall having a plurality of lobes, adjacent ones of which are separated by a peak;
   a rotor having a rotor shaft and a circular cutout region, said rotor rotatable within said housing, said rotor forming a seal with each said peak intermittently when said rotor rotates within said housing, said rotor having at least one top-dead-center position; and
   a rotating member rotatable within said circular cutout region in said rotor, said rotating member having a plurality of tips equally spaced around said rotating member, adjacent ones of said plurality of tips separated by a side surface, each of said side surfaces forming a boundary wall for a chamber, at least one of said plurality of tips forming a seal with said housing sidewall, each of said side surfaces sequentially undergoing at least a portion of an intake cycle, a compression cycle, a power cycle, and at least a portion of an exhaust cycle as said rotating member orbits said rotor shaft as said rotor rotates through an angle equal to an angular separation from a first top-dead-center position to a second top-dead-center position, each of said side surfaces undergoing said power cycle when said rotating member sidewall is adjacent one of said peaks.

9. The rotary engine of claim 8 wherein said first top-dead-center position occurs when one of said at least one circular cutout regions is centered about one of said peaks and said second top-dead-center position occurs when said one of said at least one circular cutout regions is centered about another one of said peaks.

10. The rotary engine of claim 8 wherein said housing further includes a back plate having an exhaust port and an inlet port for said rotating member.

11. The rotary engine of claim 8 wherein said housing further includes a back plate and a front plate, said front plate having a back surface facing said back plate, wherein said front plate, said back plate, and said sidewall form a cavity in said housing in which said rotor rotates and carries said rotating member.

12. The rotary engine of claim 8 further including a back ring mount receiving each said rotating member shaft opposite said rotating member gear, said back ring received by a channel in a back plate attached to said housing.

13. The rotary engine of claim 8 further including as assembly whereby said at least one rotating member orbits about said rotor while maintaining at least one tip of said at least one rotating member in contact with said plurality of lobes.

14. The rotary engine of claim 8 further including a means for orbiting said at least one rotating member about said rotor while maintaining at least one tip of said at least one rotating member in contact with said plurality of lobes.

15. A rotary engine providing internal combustion of a fuel, said rotary engine comprising:
   a housing having a housing sidewall, an inside surface of said housing sidewall having a plurality of lobes, adjacent ones of which are separated by a peak;
   a rotor having a rotor shaft and a circular cutout region, said rotor rotatable within said housing, said rotor forming a seal with each said peak intermittently when said rotor rotates within said housing, said rotor having at least one top-dead-center position;
   a rotating member rotatable within said circular cutout region in said rotor, said rotating member having a plurality of tips equally spaced around said rotating member, adjacent ones of said plurality of tips separated by a side surface, each of said side surfaces forming a boundary wall for a chamber, at least one of said plurality of tips forming a seal with said housing sidewall, each of said side surfaces undergoing said power cycle when said rotating member sidewall is adjacent one of said peaks, each of said side surfaces sequentially undergoing an intake cycle, a compression cycle, a power cycle, and an exhaust cycle when said rotating member makes one complete orbit about said rotor shaft; and
   a back ring mount receiving each said rotating member shaft opposite said rotating member gear, said back ring received by a channel in a back plate attached to said housing.

16. A rotary engine providing internal combustion of a fuel, said rotary engine comprising:
   a housing having a sidewall, an inside surface of said sidewall having a plurality of lobes, adjacent ones of which are separated by a peak, said housing including a back plate having a plurality of exhaust ports and a plurality of inlet ports;
   a rotor having a shaft and at least two arms, adjacent ones of said at least two arms forming a circular cutout region, said rotor forming a seal with each said peak intermittently when said rotor rotates within said housing;
   at least one rotating member, each of said at least one rotating member having a rotating member shaft, each said at least one rotating member rotatable within a corresponding one of said circular cutout region in said rotor, each said rotating member having three tips equally spaced around said at least one rotating member;
   a gear assembly whereby said at least one rotating member orbits said rotor shaft and at least one of said three tips of each of said at least one rotating member maintains contact with a corresponding one of said plurality of lobes a fixed orientation when orbiting said rotor shaft;
   a means for introducing a fuel into said housing;
   a means for igniting said fuel in said housing; and
   a back ring mount receiving each said rotating member shaft opposite said rotating member sear, said back ring received by a channel in said back plate.

17. A rotary engine providing internal combustion of a fuel, said rotary engine comprising:
   a housing having a sidewall, an inside surface of said sidewall having three lobes, adjacent ones of which are separated by a peak;

a back plate having a plurality of exhaust ports and a plurality of inlet ports, said back plate fixed to said housing;

a front plate having a back surface facing said back plate and an opposite front surface, wherein said front plate, said back plate, and said sidewall form a cavity in said housing;

a rotor having a shaft and at least one circular cutout region, said rotor attached to said front plate whereby said front plate rotates with said rotor, said rotor having an outer surface intermittantly forming a seal with each said peak when said rotor rotates within said housing;

at least one rotating member, each of said at least one rotating member having a rotating member shaft with a rotating member gear, said rotating member shaft passing through a corresponding opening in said front plate, said rotating member gear adjacent said front surface of said front plate, said at least one rotating member adjacent said back surface of said front plate, each said at least one rotating member rotatable within a corresponding one of said at least one circular cutout region in said rotor, each of said at least one rotating member having three tips equally spaced around said rotating member;

a back ring mount receiving each said rotating member shaft opposite said rotating member gear, said back ring received by a channel in said back plate;

a sun gear coaxial to said rotor shaft, said sun gear stationary relative to said housing;

a set of three idler gears, each said idler gear engaging said sun gear and a corresponding one of said rotating member gear;

a means for introducing a fuel into said housing;

a means for igniting said fuel in said housing;

an exhaust manifold for directing combustion gas from said plurality of exhaust ports; and an intake manifold for directing air to said plurality of inlet ports.

18. The rotary engine of claim 17 wherein each of said three tips of each said at least one rotating member includes a seal.

19. The rotary engine of claim 17 wherein each of said three tips of each said at least one rotating member includes a means for sealing.

20. The rotary engine of claim 17 wherein said rotor includes a plurality of side seals and said at least one rotating member includes a plurality of side seals.

21. The rotary engine of claim 17 wherein said rotor includes means for sealing.

22. The rotary engine of claim 17 wherein said at least one rotating member includes means for sealing a front side and a back side of each said rotating member.

23. A rotary engine providing internal combustion of a fuel, said rotary engine comprising:

a housing having a sidewall, an inside surface of said sidewall having at least two lobes, adjacent ones of said at least two lobes are separated by a peak;

a rotor having a shaft and at least one circular cutout region, said rotor forming a seal with each said peak intermittently when said rotor rotates within said housing;

at least one rotating member, each said at least one rotating member rotatable within a corresponding one of said at least one circular cutout region in said rotor, each said at least one rotating member having three tips equally spaced around said at least one rotating member whereby said at least one rotating member sequentially undergoes at least a portion of an intake cycle, a compression cycle, a power cycle, and at least a portion of an exhaust cycle when said rotor rotates through an angle equal to an angular separation from a first top-dead-center position to a second top-dead-center position;

a means for orbiting at least one rotating member about said rotor while maintaining at least one tip of said at least one rotating member in contact with said at least two lobes;

a means for introducing a fuel into said housing; and a means for igniting said fuel in said housing.

24. The rotary engine of claim 23 wherein said first top-dead-center position occurs when one of said circular cutout regions is centered about one of said peaks and said second top-dead-center position occurs when said one of said circular cutout regions is centered about another one of said peaks.

25. The rotary engine of claim 23 wherein said housing includes a back plate having an exhaust port and an inlet port for each of said at least one rotating member.

26. The rotary engine of claim 23 further including an exhaust port and an inlet port associated with each said at least one rotating member.

27. The rotary engine of claim 23 wherein said housing further includes a front plate, said front plate having a back surface facing a back plate secured to said housing, wherein said front plate, said back plate, and said sidewall form a cavity in said housing in which said rotor rotates and carries said at least one rotating member.

28. The rotary engine of claim 23 wherein said housing further includes a front plate, said front plate having a back surface facing a back plate secured to said housing, wherein said front plate, said back plate, and said sidewall form a cavity in said housing in which said rotor rotates and carries said at least one rotating member, each said rotating member shaft passing through a corresponding opening in said front plate.

29. The rotary engine of claim 23 further including a back ring mount receiving each said rotating member shaft opposite said gear assembly, said back ring received by a channel in a back plate.

* * * * *